United States Patent
Kim et al.

(10) Patent No.: US 10,802,673 B2
(45) Date of Patent: Oct. 13, 2020

(54) MULTI-SELECTION ON A CHART

(71) Applicant: salesforce.com, inc., San Francisco, CA (US)

(72) Inventors: Yuseung Kim, San Francisco, CA (US); Edward Charles Mengel, III, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 153 days.

(21) Appl. No.: 15/675,455

(22) Filed: Aug. 11, 2017

(65) Prior Publication Data

US 2019/0050116 A1    Feb. 14, 2019

(51) Int. Cl.
*G06F 3/0482*  (2013.01)
*G06F 3/0488*  (2013.01)
(Continued)

(52) U.S. Cl.
CPC ........ *G06F 3/0482* (2013.01); *G06F 3/04842* (2013.01); *G06F 3/04847* (2013.01); *G06F 3/04883* (2013.01); *G06F 16/2428* (2019.01); *G06T 11/206* (2013.01); *G06F 2203/04808* (2013.01)

(58) Field of Classification Search
CPC ......... G06F 2203/04808; G06F 3/0488; G06F 3/0482
See application file for complete search history.

(56) References Cited

U.S. PATENT DOCUMENTS 5,428,805 A * 6/1995 Morgan .............. G06F 3/04883
                                            345/173
6,750,864 B1 * 6/2004 Anwar .................. G06T 11/206
                                            345/440
(Continued)

FOREIGN PATENT DOCUMENTS

WO    WO-2016138566 A1 * 9/2016 ......... G06Q 10/0633

OTHER PUBLICATIONS

Gimp. 2.4. Free Selection (Lasso), Mar. 2009, pp. 3 retrieved from [https://web.archive.org/web/20090322045829/http://docs.gimp.org/en/gimp-tool-free-select.html] on [Jan. 13, 2020]. (Year: 2009).*
(Continued)

*Primary Examiner* — Amy M Levy
(74) *Attorney, Agent, or Firm* — Sterne, Kessler, Goldstein & Fox P.L.L.C.

(57) ABSTRACT

Disclosed herein are embodiments for systems and devices implementing methods of accessing databases, which may include displaying graphical representations of data such as in graphs or charts, implementing a GUI to accept selection gestures by way of input devices and allowing selection of multiple data elements on a display. The embodiments may further include mapping selection position data, determining sets of selected data, and generating database queries based on those determined sets. Queries may be transmitted to databases, to retrieve information corresponding to selected elements. Additionally, the retrieved information may be analyzed to produce results, which may be displayed together with the graphs or charts. Various techniques of selection and de-selection for single data elements or multiple data elements may also be provided.

24 Claims, 37 Drawing Sheets

(51) Int. Cl.
　　*G06F 3/0484*　　(2013.01)
　　*G06T 11/20*　　(2006.01)
　　*G06F 16/242*　　(2019.01)

(56) References Cited

U.S. PATENT DOCUMENTS

| | | | | |
|---|---|---|---|---|
| 7,058,657 | B1* | 6/2006 | Berno | G06F 16/26 |
| 7,299,424 | B2* | 11/2007 | Jarrett | G06F 3/0481 |
| | | | | 715/823 |
| 7,454,711 | B2* | 11/2008 | Angiulo | G06F 16/958 |
| | | | | 715/760 |
| 7,454,717 | B2* | 11/2008 | Hinckley | G06F 3/04883 |
| | | | | 715/863 |
| 9,891,808 | B2* | 2/2018 | Wilson | G06F 3/04817 |
| 9,911,211 | B1* | 3/2018 | Damaraju | G06T 11/206 |
| 10,156,975 | B1* | 12/2018 | Kim | G06F 3/0486 |
| 2003/0030637 | A1* | 2/2003 | Grinstein | G16B 45/00 |
| | | | | 345/420 |
| 2003/0214536 | A1* | 11/2003 | Jarrett | G06F 3/0481 |
| | | | | 715/831 |
| 2004/0030741 | A1* | 2/2004 | Wolton | G06F 16/954 |
| | | | | 709/202 |
| 2006/0085767 | A1* | 4/2006 | Hinckley | G06F 3/04883 |
| | | | | 715/863 |
| 2006/0224983 | A1* | 10/2006 | Albrecht | G06F 3/0482 |
| | | | | 715/764 |
| 2007/0203902 | A1* | 8/2007 | Bauerle | G06Q 30/02 |
| 2009/0094560 | A1* | 4/2009 | Grossman | G06F 3/04883 |
| | | | | 715/863 |
| 2012/0026100 | A1* | 2/2012 | Migos | G06F 3/04883 |
| | | | | 345/173 |
| 2014/0250377 | A1* | 9/2014 | Bisca | G06F 16/93 |
| | | | | 715/705 |
| 2014/0282276 | A1* | 9/2014 | Drucker | G06F 3/04847 |
| | | | | 715/863 |
| 2015/0015504 | A1* | 1/2015 | Lee | G06F 3/04845 |
| | | | | 345/173 |
| 2015/0029194 | A1* | 1/2015 | Ruble | G06T 11/206 |
| | | | | 345/440 |
| 2015/0205398 | A1* | 7/2015 | Le | G06T 11/00 |
| | | | | 345/173 |
| 2016/0055232 | A1* | 2/2016 | Yang | G06F 16/2428 |
| | | | | 707/740 |
| 2016/0070430 | A1* | 3/2016 | Kim | G06F 3/0486 |
| | | | | 715/769 |
| 2016/0071297 | A1* | 3/2016 | Ruble | G06T 11/206 |
| | | | | 345/440 |
| 2016/0103872 | A1* | 4/2016 | Prophete | G06F 16/2428 |
| | | | | 707/722 |
| 2016/0103886 | A1* | 4/2016 | Prophete | G06F 16/248 |
| | | | | 707/722 |
| 2016/0371412 | A1* | 12/2016 | Marie | G01D 4/002 |
| 2018/0137667 | A1* | 5/2018 | Kindelsberger | G06F 3/0482 |

OTHER PUBLICATIONS

Sadana et al. (Expanding Selection for Information Visualization Systems on Tablet Devices. ISS'16, Nov. 6-9, 2016, Niagara Falls, ON, Canada. DOI: http://dx.doi.org/10.1145/2992154.2992157. pp. 149-158) (Year: 2016).*

* cited by examiner

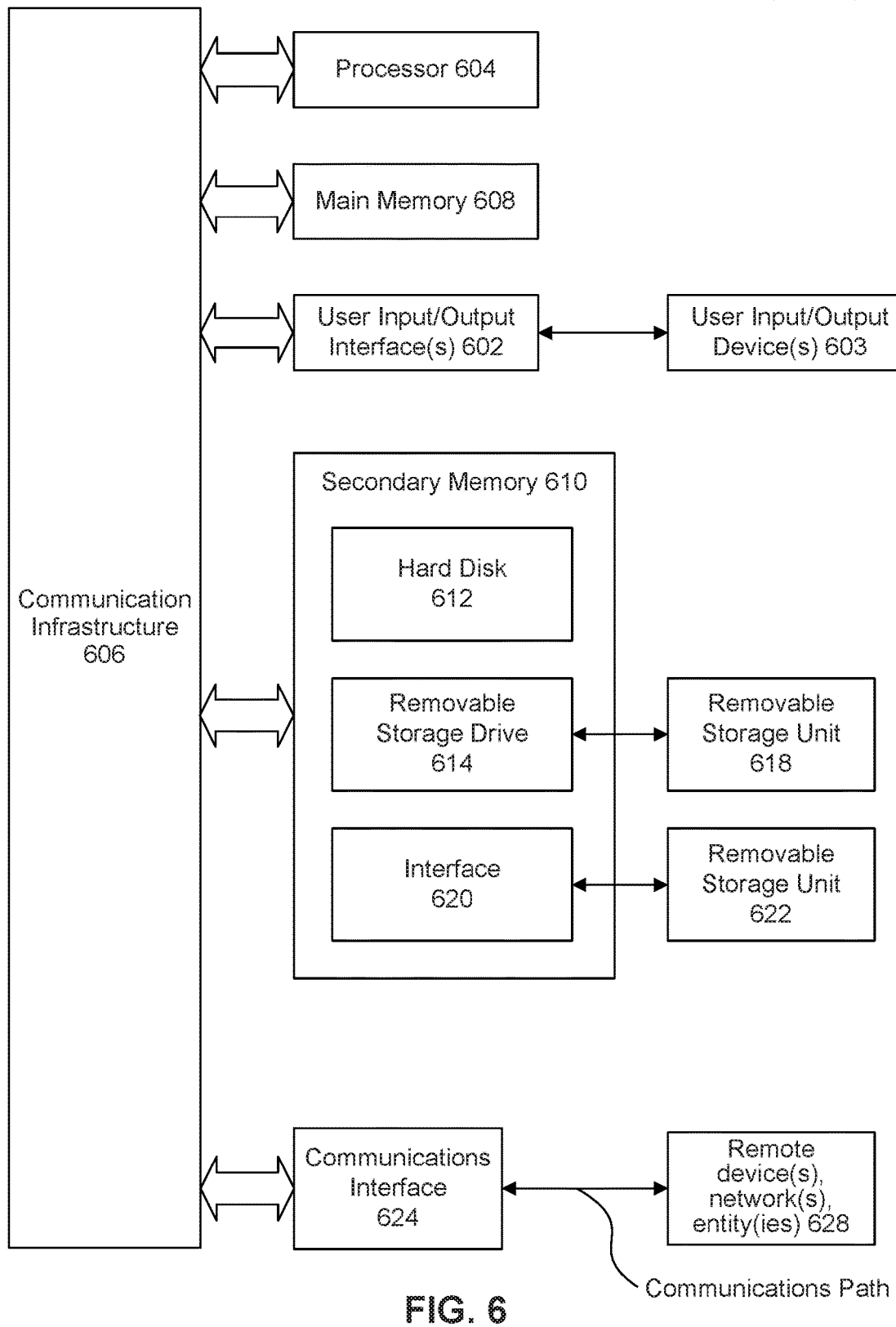
FIG. 6
(CONVENTIONAL)

MULTI-SELECTION ON A CHART

BACKGROUND

Modern graphical user interfaces (GUIs) for graphic visualization of data can allow for a user to interact with charts or graphs in order to find specific data points, statistics, or other trends. Examples include interfaces for spreadsheet software and mathematical modeling or graphing utilities.

However, until now, detailed charts and graphs have presented difficulties to users viewing them who also want to select portions of a chart or graph for further information or analysis. Unique difficulties further arise with such selection via touch-screen interfaces and/or on small screens. Depending on the size and complexity of a visualization data set, any screen of limited size and resolution can pose such interface problems for users.

BRIEF SUMMARY

From a user's perspective, a multiple selection, i.e., selection of multiple elements, may be performed in a number of different ways. For example, in a multi-selection mode, it may be possible to select multiple elements by selecting a single element, then subsequently selecting another single element, and repeating these steps until all of the desired elements are selected. This is referred to herein as sequential multi-selection.

However, although sequential multi-selection may be an intuitive and acceptably usable technique for very sparse or otherwise simple charts, sequential multi-selection may have some limitations that frustrate users as charts increase in density and/or complexity. For example, where multiple elements (such as bars or segments in a bubble chart) overlap, a selection interface limited to sequential multi-selection as the only way to select multiple elements may make it difficult or impossible to select all overlapping elements or to pick certain elements out of an overlapping group to select while leaving others in that group unselected. Also, selecting a large number of discrete elements only using sequential multi-selection is nevertheless time-consuming, even if not otherwise difficult.

More sophisticated methods of multi-selection on a chart are described herein, which afford users the advantages of quick and efficient selection of GUI elements, with real-time reports and visualizations of their corresponding data elements, as well as accurate selection of desired elements, with variable-precision control for selection and de-selection of specific elements that are closely grouped in a chart. The result is an intuitive, user-friendly interface, for a variety of devices, that saves a great deal of time and trouble for users, in addition to providing users with additional insights into selected data, to extract more meaning from selected data without the user performing any extra steps for additional analysis.

In embodiments disclosed herein, novel user interface designs may be implemented to improve user experience by allowing greater precision of selection and intuitive ease of use in selecting multiple objects on a chart or graph. Users may navigate data visualizations using streamlined controls and quickly obtain new analysis of selected data in real time.

In a case of a bar chart or stacked bar graph, a simple motion or gesture across the chart or graph may be used to select multiple contiguous data elements. For small elements that would be otherwise difficult to select, various means of selecting these small elements may be provided, including selection of groups of elements followed by de-selection of larger elements in the group, zooming in to enlarge small elements, virtual-height handles allowing for greater tolerances in accepting user input, or any combination of these or other comparable techniques.

In a case of a bubble chart, selection may be performed by multiple taps, dragging, or by drawing a free-form region (lasso selection) around bubble-shaped data elements. The scope of the enclosed lasso selection may be determined by linear interpolation or spline interpolation, to name some non-limiting implementation examples known in the art. Bubbles may be selected when their centers of mass fall within the lasso selection.

Accordingly, as demonstrated via examples in detailed, non-limiting embodiments described below, this intuitive user interface for selection of data representations results in improved user experience.

BRIEF DESCRIPTION OF THE DRAWINGS

The accompanying drawings are incorporated herein and form a part of the specification.

FIG. 6 is an example computer system useful for implementing various embodiments.

DETAILED DESCRIPTION

Provided herein are system, method and/or computer program product embodiments, and/or combinations and sub-combinations thereof, for fragmentation and messaging across web applications.

Figure 1:
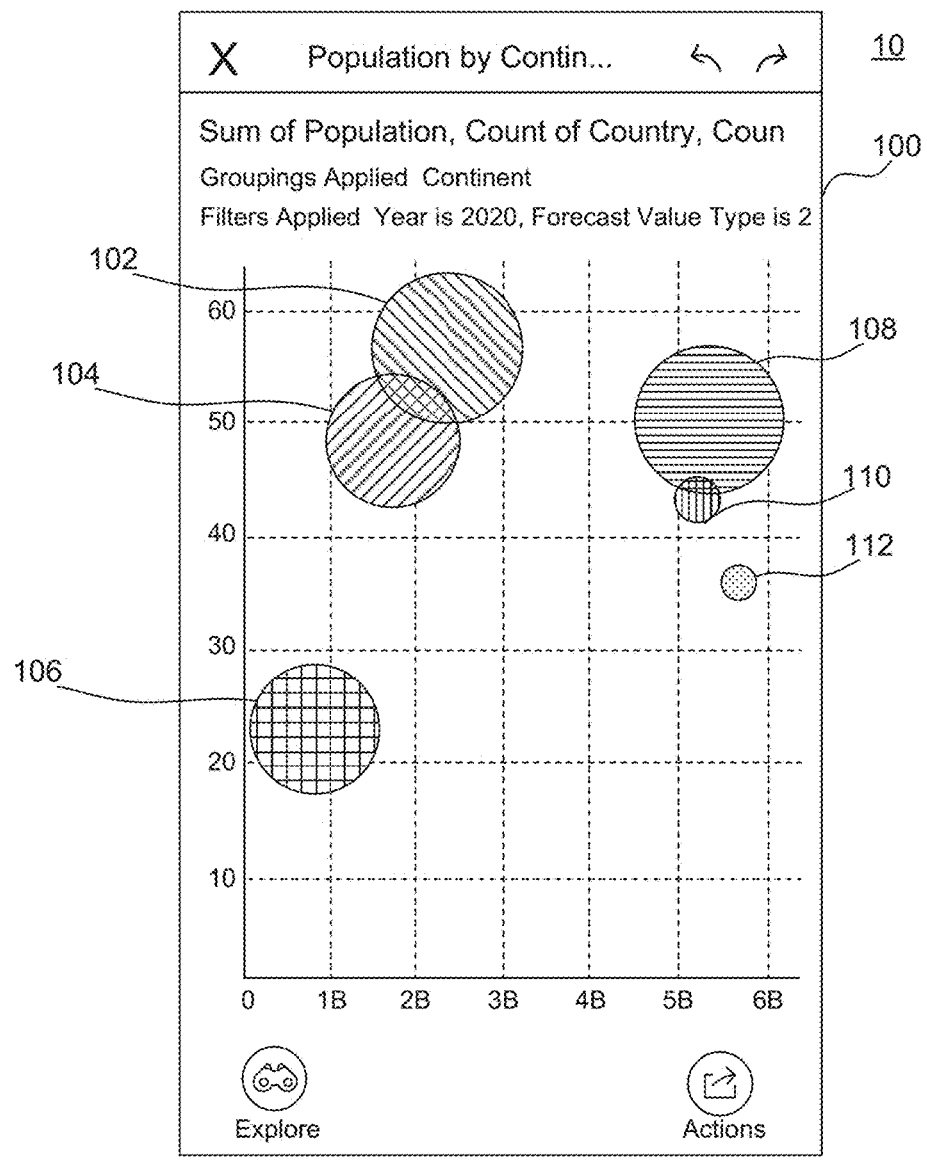
FIG. 1 is an example simulated graphical user interface (GUI) demonstrating a bubble chart, according to some embodiments.

FIG. 1 is an illustration of an exemplary graphical user interface (GUI) having support for multi-selection in a chart, according to an example embodiment of a bubble chart. Depicted in FIG. 1 is the visible area of a GUI display 100 on a computer system 10. In this exemplary embodiment, a set of graphical elements ("bubbles") 102-112 may be arranged in a graphical representation of underlying data or data sets, with data elements or groups of like data elements, each being graphically represented by a bubble, and which may appear in the GUI display 100, or which may be hidden depending on a view of the GUI display 100, which may be panned and/or zoomed such that not all available bubbles may be visible. One of ordinary skill may appreciate that, although this exemplary embodiment only shows bubbles 102-112 for illustrative purposes, actual implementations may allow any number of bubbles to be displayed in GUI display 100.

Bubbles may be represented by any shape, and may further include any color scheme or shading. For example, bubbles may be any polygonal shape, including representations of elliptical or circular shapes or elements as rendered on GUI display 100 of a computer system 10, such as by scaling bitmaps or vector graphics, in some embodiments. Additionally, shapes may be filled, opaque or with various degrees of transparency, or textured (e.g., with icons, images, patterns, photographs, etc.), may have contrasting colors at borders of any width, and may also have shading effects for three-dimensional ("3D") or pseudo-3D rendering. For the purposes of this exemplary embodiment, bubbles will be circular, with transparent shading.

Optionally, in some embodiments, bubbles may be arranged along a coordinate axis or coordinate axes, in a one-, two-, or three-dimensional coordinate system. In addition, in the same or other embodiments, tick marks, grid lines, and any legend(s) may also optionally be displayed to facilitate a viewer's understanding of a given scale of a visual representation. Such tick marks, grid lines, and/or legend(s) may be displayed underlying the graphed elements (shown) or may be overlaid, with varying degrees of transparency. Coordinate axes may represent any quantifiable aspect of the underlying data, and may be on any scale, e.g., linear, logarithmic, exponential, etc. As each element of the underlying data may have a practically unlimited number of different attributes and quantifiable aspects, a coordinate axis may represent any one of such quantifiable aspects, and any coordinate axes may be selected and changed at any time according to user input or other preference setting. Scale of coordinate axes may also be adjusted arbitrarily, or automatically fit to GUI display 100.

Bubbles may be of fixed size, or may scale in size, color (hue, brightness, saturation, or other chromatic value), transparency, border dimensions, shape (e.g., elliptical axis, polygon sides, etc.), or any other visual aspect, corresponding to a quantifiable aspect of the underlying data, which may be different from other quantifiable aspects defining any coordinate axes. Bubbles on a coordinate axis or coordinate axes may be arranged such that the center of mass of each bubble aligns with its corresponding point on each coordinate axis, as is shown in this exemplary embodiment of FIG. 1; however, any other representative point of a bubble may be used consistently across a visual representation arranged along any coordinate axis or axes.

Regarding selection of multiple elements (bubbles, in this case), a given GUI may provide several types of operations to accomplish the same result. In an example embodiment, the GUI may operate in at least one of a variety of modes, including a browsing mode (also called a viewing mode or exploratory mode) and at least one selection mode. One selection mode, for example, may be an exclusive selection mode, allowing active selection of only one element at a time: an element may be selected, but selection of a different element will automatically de-select the previously-selected element, similar to a radio button element in other various types of user interfaces. By contrast, a multi-selection mode may allow for selection of multiple elements while the multi-selection mode is enabled. Such multiple selection may be simultaneous or sequential, but may persist at least as long as the multi-selection mode is enabled.

As a practical example, modal operation is described, which may allow the GUI to switch from one mode to another, e.g., browsing mode to exclusive selection mode to multi-selection mode, and such mode switching may be configured to occur in a set linear sequence, a stack-type sequence (first in, last out), or in no particular sequence (directly switching to an arbitrary mode, e.g., by pressing a button or selecting a menu item or icon).

Modes may additionally be hierarchical along these lines, having main modes and sub-modes, whereby it may be possible to switch sub-modes within a main mode, also switching between main modes regardless of any sub-mode state within a main mode. Sub-mode states may be persistent across switching of main modes, or sub-modes may alternatively reset to a default with any main mode switch. Sub-modes may be treated as contexts, in some embodiments, which may not need to be expressly invoked, switched on, or otherwise activated, but rather contextually enabled while a certain other action is being performed, or when a certain area of the screen is used for what would otherwise be a selection, for example.

It is alternatively possible, however, to have a multi-selection-enabled GUI without any other modes, thus having multi-select chart capability always on, in other embodiments. For illustrative purposes, any such multi-selection operation as described in this paragraph will be referred to in this description as being in a multi-selection mode.

In a multi-selection mode, the number of elements that may be selected at a given time may be limited to a finite number or within upper or lower bounds (e.g., up to five elements, exactly four elements, at least three elements), in some embodiments. Alternatively, the number of elements that may be selected at a given time may be limited only by other system limitations, such as data type; in other words, a multi-selection mode without any explicit limits on a number of elements to be selected at a time may thus allow for a virtually unlimited number of elements to be selected.

For specific examples of how multiple elements may be selected in FIG. 1, it may be possible in a multi-selection mode to perform sequential multi-selection, i.e., selecting a single element, then subsequently selecting another single element, and repeating these steps until all desired elements are selected. However, depending on the density or complexity of a given chart, or in cases in which the number of desired elements to be selected is relatively large to the extent that sequential multi-selection would be uncomfortably time-consuming or difficult, it may also be possible in a multi-selection mode to perform a drawing multi-selection (also called a free-form selection or lasso selection), thereby quickly and efficiently encompassing a relatively large selection of elements with what is essentially a single intuitive operation for a user to perform.

Drawing selection may be performed in a multi-selection mode that is the same multi-selection mode in which sequential multi-selection may be performed, in some embodiments. In other embodiments, mode selection may be configured to require explicit selection of a drawing selection mode. In a multi-selection mode configured to allow both sequential multi-selection and drawing multi-selection, in some embodiments, drawing multi-selection may be initiated when a user performs an action tantamount to selecting an empty part of the chart using a pointing device, such as a finger on a touch screen or touch pad (tactile sensor), mouse, motion controller, motion sensor, position sensor, light sensor, etc., followed by a dragging operation. In other embodiments, drawing multi-selection may begin with selection of at least one element and continue in the same way as if the first selection had been directed to an empty part of the chart. The drawing multi-selection operation including a dragging operation is further described below.

In some embodiments, the dragging operation may involve holding or locking a button or other active selection state of the pointing device and moving the pointing device while the button is held or locked in the active selection state. When the pointing device is moved, in some embodiments, a trail or tracer may follow a pointer or cursor such that a line or curve is drawn across the chart. The line or curve may be a free-form drawing, which may enclose or encompass multiple graphical elements representing data elements on the chart.

In some embodiments, the free-form drawing need not be completed by the user to the extent that the user would have to draw a completely enclosed area or space, but instead may be left open by the user. In the case of such an open drawing multi-selection, the computer system 10 may be configured with logic to interpolate a closing segment between the end point of the free-form drawing and the start point of the free-form drawing, either as a straight line between the two points (linear interpolation), or as a spline between starting and ending segments of the free-form drawing (spline interpolation), so as to maintain a smooth shape that may be more intuitively what the user would expect, in some embodiments.

Such interpolation features would allow a chart configured to support multi-selection thus to be forgiving and accommodating where users may not always be able to draw a neat and precise shape around all desired elements. Interpolation features such as these would therefore also be especially useful as accessibility features that may assist users with visual impairments or limited motor control, for example.

Once the drawing multi-selection operation is completed, either by the user directly or by computer system 10 having performed an interpolation operation, then all elements inside the completed free-form drawing may be selected. If all desired elements are selected as a result, then the user may carry on with additional or separate operations.

However, if there are additional desired elements outside of what has been selected at this point, the user may, in some embodiments, perform sequential multi-selection operations to include further elements in addition to the elements already selected by drawing multi-selection, without de-selecting the existing selection. In other embodiments, depending on the multi-selection mode(s) or sub-mode(s) available in the GUI, or additional buttons, button combinations, or gestures available on the computer system 10 or in the GUI, the user may continue with another drawing multi-selection, again without de-selecting the existing selection and without switching modes.

Similarly, if the drawing multi-selection has encompassed a few extraneous elements other than the desired elements, then such elements may be excluded or de-selected, such as by a different button, button combination, or gesture on the computer system 10 or in the GUI, or by switching to a de-selection sub-mode or main mode. In a de-selection mode, de-selection may be performed in the same manner as selection, and similarly for multi-de-selection as with multi-selection. In some embodiments, the multi-selection mode may have sub-modes both for selection and de-selection of multiple elements.

Adding to these supplemental steps of selection and de-selection after a multi-selection, including after a drawing multi-selection, each subsequent selection or de-selection, including each subsequent drawing multi-selection and equivalent de-selection operation, may be preceded by any combination of panning, scrolling, or zooming operations to facilitate subsequent selections or de-selections, especially of smaller or more densely grouped elements.

It is additionally possible to select or de-select elements not only by expressly indicating which elements are to be selected or de-selected, but also by an action of inverting an existing selection, in some embodiments. For example, if a user wished to select all but one out of a large number of elements, the user may be able to select all elements, and then de-select the one not desired for selection. Using an action to invert selection, in an embodiment, the user instead could select the one element not desired, then invoke the action to invert the selection, which in turn would select all elements that are not presently selected, and de-select all elements that are presently selected. Such a selection inversion action allows for easy viewing of and switching between complementary data sets, for example, quick views of statistical summaries for both X and non-X elements of the dataset, in an example where all elements X are selected as a subset of the dataset graphed in the corresponding chart.

As each element or group of elements is selected or de-selected, GUI display 100 on computer system 10 may further display or modify selection indicia, which in some embodiments may include new or modified properties of displayed graphical elements such as size, color (hue, brightness, saturation, or other chromatic value), transparency, border dimensions, shape (e.g., elliptical axis, polygon sides, etc.), or any other visual aspect, corresponding to a quantifiable aspect of the underlying data. The same changes to selection indicia effected with a selection may be reversed for a de-selection, or they may be modified in another manner consistent with de-selection operations in any given mode or sub-mode.

Additionally, as elements are selected, values pertaining to any attributes or quantifiable aspects of the selected elements may be displayed on GUI display 100, or output via any other means, including but not limited to a separate display on a separate device, other visual, audible, or tactile means, other programmatic or computer readable output such as via an application programming interfaces (API), socket, shared memory, hardware port, printer, etc.

Further, as each element or group of elements is selected or de-selected, computer system 10 may perform analysis of the data elements corresponding to the selected elements, including analysis of any other quantifiable aspects of these selected data elements not displayed on the chart, according to some embodiments. Such analysis may commonly comprise statistics, trends, regressions, etc., but these examples are not limiting. As with the above display or output of corresponding values from the underlying data, there may be a similar display or output of results of the analysis performed on the selected data elements.

Other graphical representations accompanying a selection of elements, such as animations, trails, flashing, badges superimposed over selected or non-selected elements, grayscaling, color fading, or color inversion, to name some non-limiting examples, may optionally accompany the multi-selection shown here. Any of the above may be considered indicia of selection for elements displayed on a chart, visually differentiating selected elements from non-selected elements.

Regarding underlying platform technology, in an embodiment, such GUI display 100, including charts or graphs and user interface for selection, de-selection, and related actions, may be part of software on computer system 10, which may be integrated with or communicatively coupled to a display device (not shown). The software may be a native application, modular or separately installed from an operating system, or alternatively integrated with an operating system running on computer system 10, or otherwise bootable on computer system 10, in some embodiments. The software may be executed and run alongside other software in a multitasking environment. In some embodiments, the software may be, or may be part of, a web application running in a web browser or comparable software platform. The application may execute entirely in a web browser, including some embodiments as a progressive web application (PWA). In other embodiments, the application may be a hybrid application, executing parts of program code both within a web browser or comparable software platform runtime environment, and executing parts of program code natively on the underlying computer system 10.

Regarding implementation details of the charts per se, the charts may be visual representations of entries in a database, such as rows in a column-oriented database, to name a non-limiting example in some embodiments. A database may be any representation of data relating certain quantifiable aspects of data to other quantifiable aspects or other attributes of data entries in a dataset or database. A dataset or set of data may be an entire database, a subset of a database, or may encompass multiple databases or subsets thereof. A database or dataset may be a flat text file, comma-separated values (CSV), key-value pairs, or other structured text or binary data conforming to any of a variety of database standards or other formats, in some exemplary embodiments. In one illustrative example, an application may have a list of data entries, each rendered as a graphical element such as any of bubbles 102-112. The list of data entries rendered may have been read from a stream or file containing the entire list formatted in JavaScript Object Notation (JSON), to give one non-limiting example.

Charts may be rendered in various stages, in some embodiments. For example, depending on a set of data to be rendered, a relative scale and window may be manually or automatically configured, so as to have a meaningful set of coordinate axes on which to display data within the GUI display 100, in some exemplary embodiments. Next, or at substantially the same time, points indicating center of mass or other representative points of bubbles may be pre-rendered. Subsequently, or at substantially the same time, any remaining visual representation of elements may be rendered, such as full-size or scaled bubbles, colors, textures, graph lines, etc. In some embodiments, the speed of these rendering stages, in sequence or parallel, maybe sufficiently fast such that a user may not be able to discern separate steps of pre-rendering and final rendering, for example.

It can be appreciated that actual selection actions may be done in a variety of ways. In some embodiments, for example, elements may be selected by activating a pointing device pointing to within the visually rendered area of an element on GUI display 100. As a familiar example, activating a pointing device pointing to within the visually rendered area of an element on GUI display 100 may involve clicking a mouse while a pointer or cursor corresponding to the mouse overlaps the rendered area of the element to be selected. Another familiar example may be of touching the element with a finger on a touch screen. Any other comparable actions are possible, such as with touch pad (including use of a stylus or other touch device), motion controller, motion sensor, position sensor, light sensor, etc. Activations may be with a button press or click, tap, long press, drag, flick, or virtually any other action or gesture.

In a similar fashion, directly selecting an element that is too small to be easily pointed to on the GUI display 100 may be facilitated by GUI handles, visible or invisible, or by having virtual sizes of elements larger than the displayed size (physical size) of an element on GUI display 100. For example, in an embodiment with only a touch screen, to select a small element that is represented by only one pixel rendered, this small element may have a selectable virtual size of a circle with a radius of approximately ten pixels in any direction, so as to facilitate selection of this small element with a finger on a touch screen, in some embodiments. Similarly, when activated on a touch screen, or when a pointer or cursor draws near, such as with a mouse, motion controller, or other sensor, the a graphical element of the virtual size may be rendered visibly, corresponding to the data element of the original graphical element to be selected. Separately or in addition, such a candidate element for selection may be highlighted or otherwise indicated with separate indicia for possible selection in this manner.

In addition to directly selecting any one element, multiple elements may be selected, either in a multi-selection mode, sub-mode, or context, or by default. In some embodiments, as a user draws a free-form selection boundary line around an area of the GUI display 100, computer system 10 may determine, afterwards or simultaneously, which elements fall within the area enclosed by the boundary line. This determination may be made, in some embodiments, by determining intersection of selection position data corresponding to the selection with display position data corresponding to the elements. Position data corresponding to the elements may, in some exemplary embodiments, include pixel data corresponding to final rendered area of the elements, or pixel data corresponding to the pre-rendered points as described above, for example. Each of the position data (pixel data) may be uniquely related to an underlying data element.

Data elements corresponding to the graphical elements selected in this way thereby form the selected dataset. The selected dataset may be generated, in some embodiments, by first creating a set or list of the selected pixel data and/or uniquely related underlying data elements, using an internal representation or notation that may be ordinarily passed between programmatic elements, for example, JSON-formatted data. Such a list of selected pixel data or uniquely related underlying data elements may also then be used to form a database query crafted to return or retrieve other relevant portions of the selected dataset from the corresponding database(s), corresponding only to selected entries, in some exemplary embodiments.

In addition, the relevant data returned by the query derived from the selection may be fed into other functions for further analysis, in some embodiments. For example, for each value of a certain field of every row of the dataset of selected elements, it may be possible to calculate certain statistics, such as at least one of a sum, mean, median, range, variance, or standard deviation, to name some non-limiting examples. Additionally, there may also be correlations to other datasets or to all displayed data as a whole, which may further include generating regression curves within the selected region of GUI display 100, or other displays of local and/or temporal trends, in various embodiments.

In some embodiments, selected pixel data may be determined in substantially real time, generating a new database query each time the number elements in the selected pixel area changes. As new data are returned for selected elements with each query, the further analyzed values may also be updated in substantially real time. Additionally, as the selection changes in this manner, so would be any calculated statistics, correlations, regressions, or trends, such as those of the exemplary embodiments described immediately above.

As a selection changes, indicia of selection as displayed on GUI display 100 may be updated in substantially real time. In addition, any calculated statistics, correlations, regressions, or trends may also be displayed on GUI display 100, in textual and/or graphical form(s), and may also be updated in substantially real time as the selection changes. Such textual representations may be displayed in a separate window, frame, or pane, apart from any graph section of the chart, in some embodiments. Alternatively, textual representations may be displayed in a pop-up balloon, dialog, or other similar overlay superimposed on any graph section of the chart, in other embodiments. Graphical representations of statistics, correlations, regressions, or trends of the selected data may also be displayed in a separate graph or chart, or instead may be superimposed on the chart of GUI display 100 at substantially the same time as the selection is being made on the same display.

In a case of a touch screen, motion controller, or similar input device, without relying on other peripheral devices for user input, GUI display 100 may include icons, virtual buttons, or hotspots for selecting actions or switching modes or sub-modes, etc. In some embodiments, icons or virtual buttons may further include indicia of a current mode, sub-mode, or context, and/or an action currently being performed or about to be performed.

In a case of a mouse, touch pad, motion controller, or other sensor-based input device, a pointer or cursor may also be visibly displayed on GUI display 100 to facilitate pointing and selection, especially for drawing multi-selection operations, in some embodiments. Use of such a pointer or cursor may optionally be present with a touch screen, such as for an added accessibility feature, although it would not be necessary in the case of the touch screen generally.

Figure 2A:
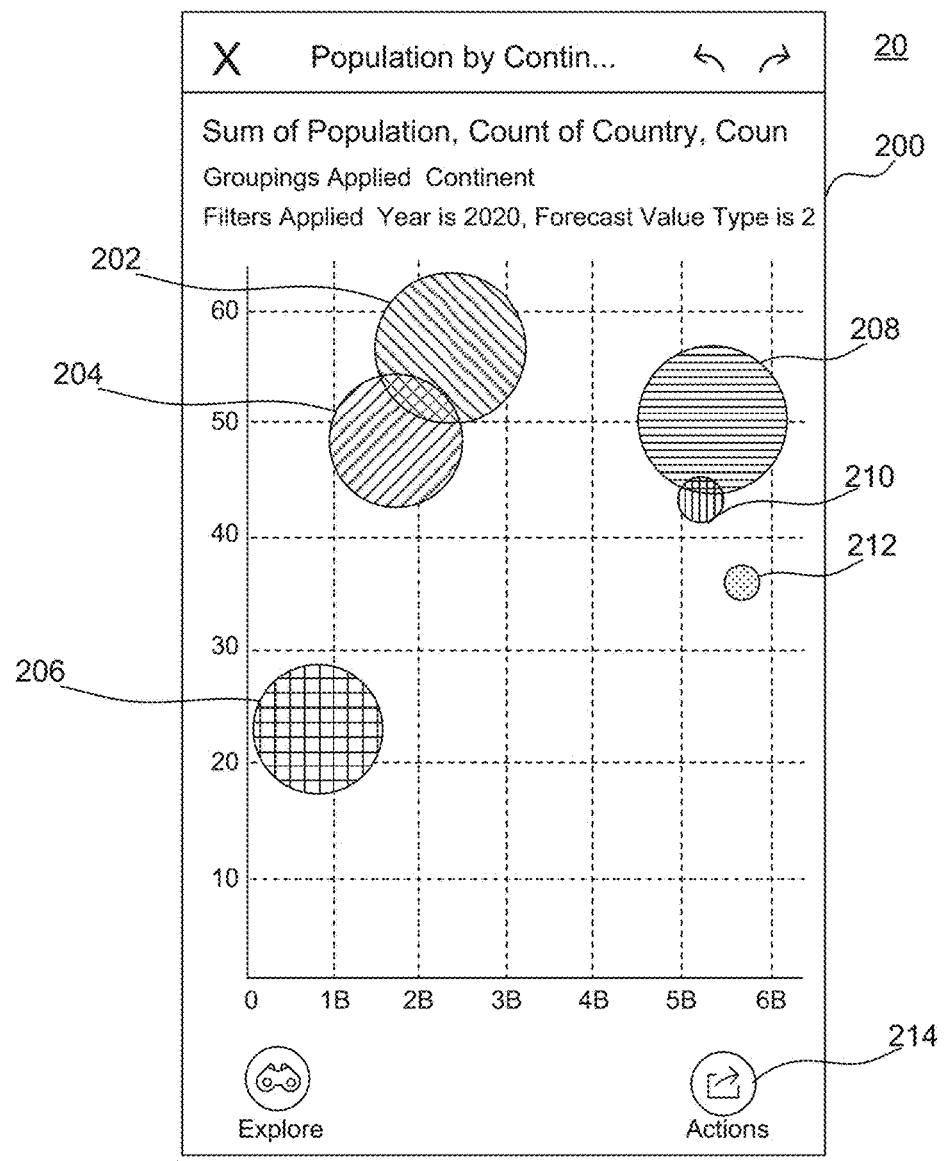
FIGS. 2A-2N demonstrate an animated action of selecting multiple elements of a bubble chart, according to some embodiments.
Figure 2B:
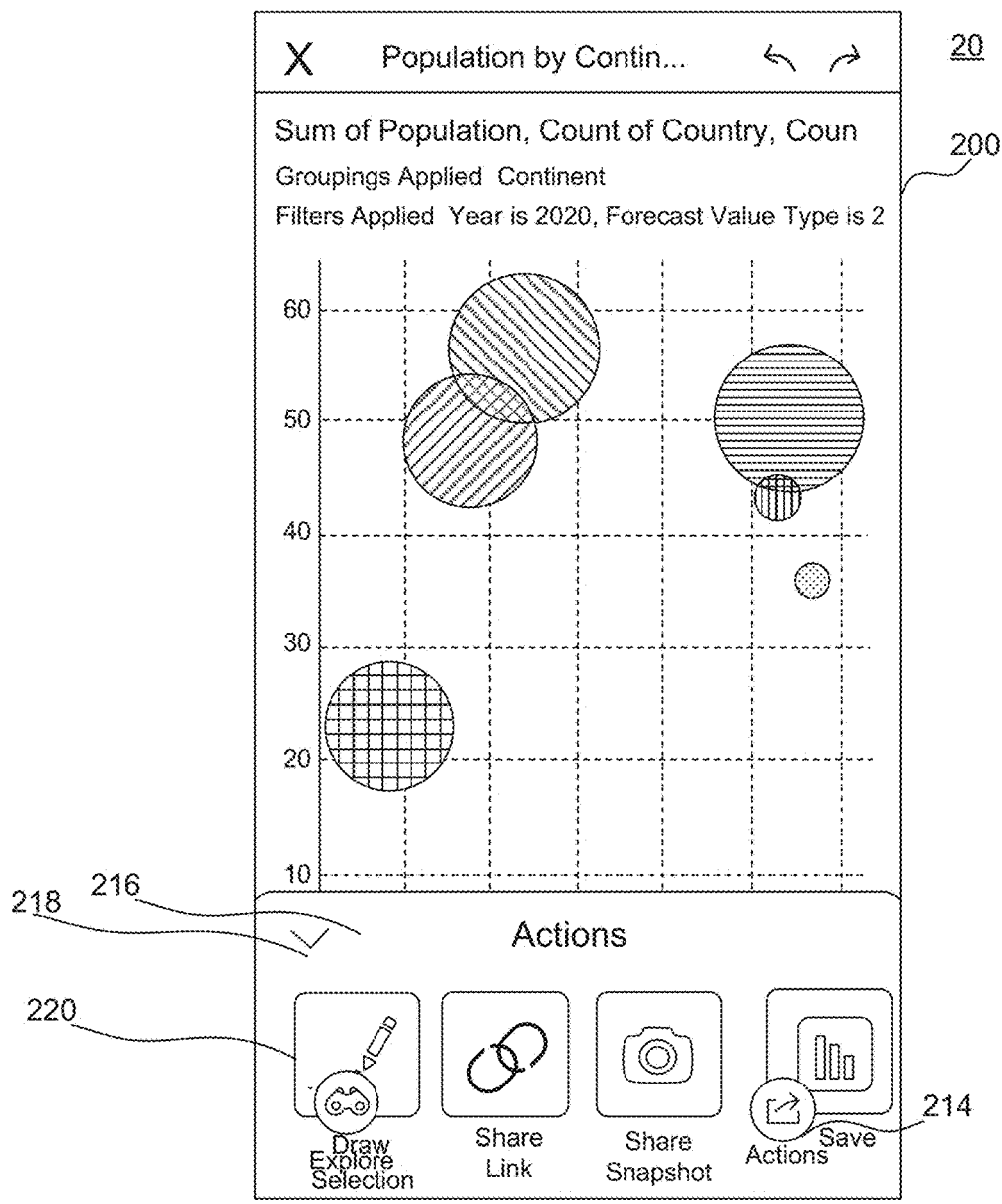
Figure 2C:
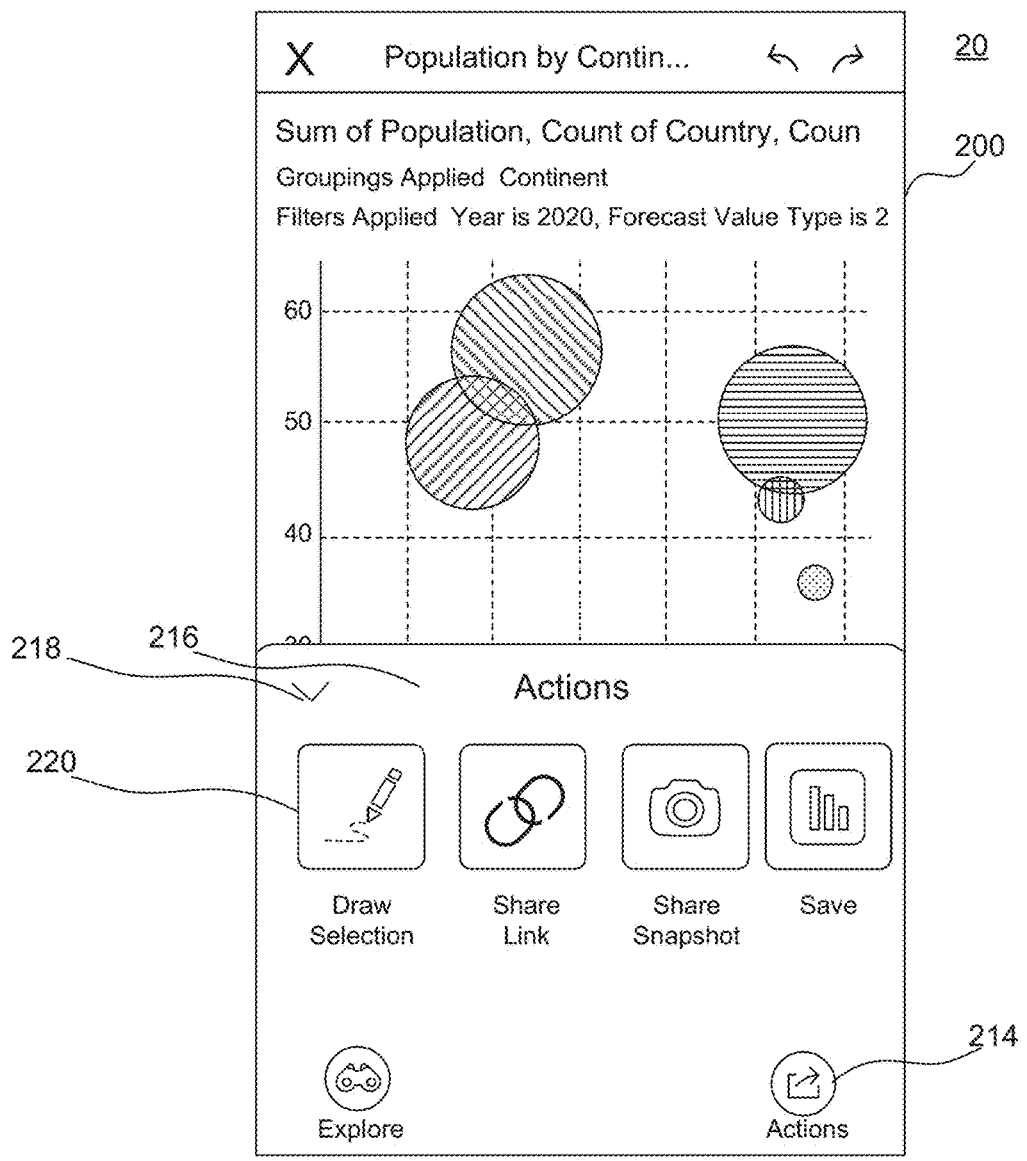
Figure 2D:
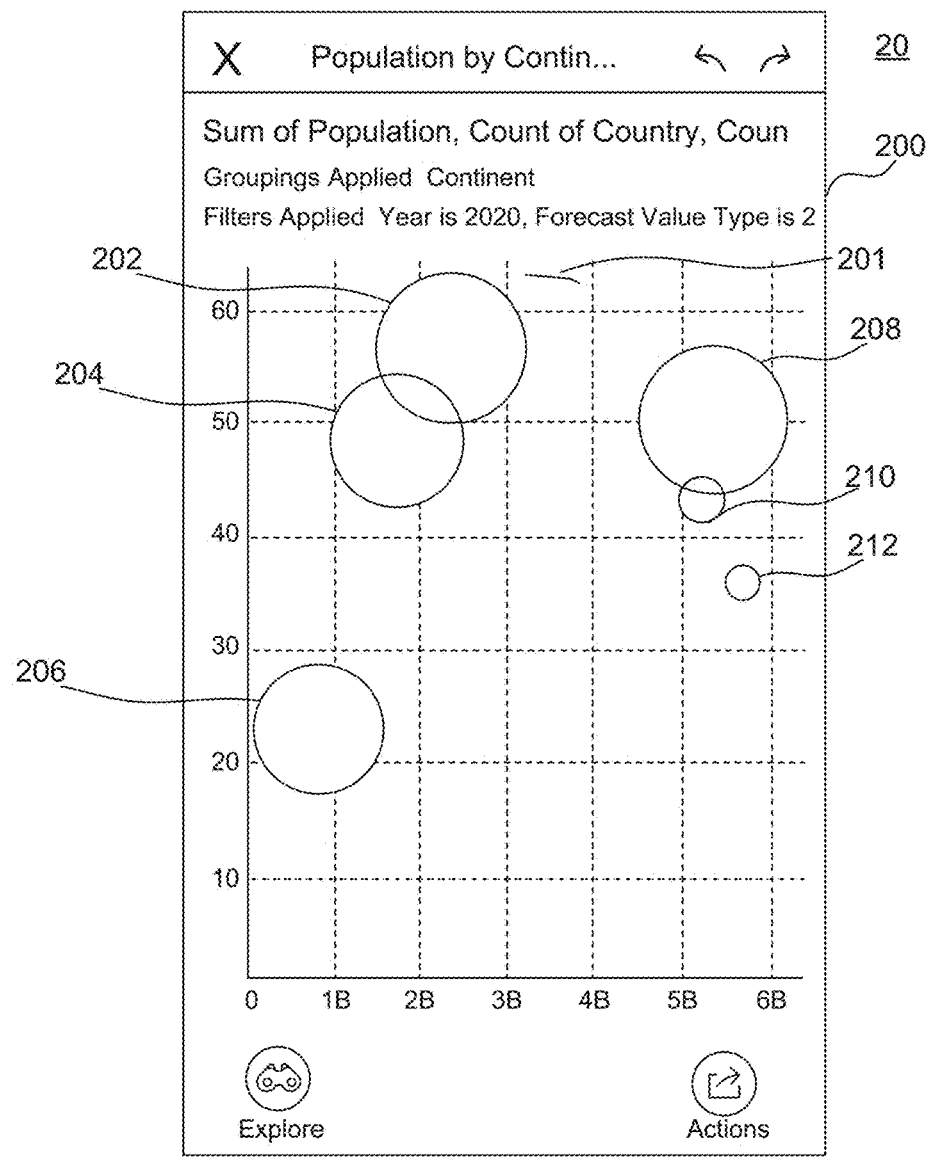
Figure 2E:
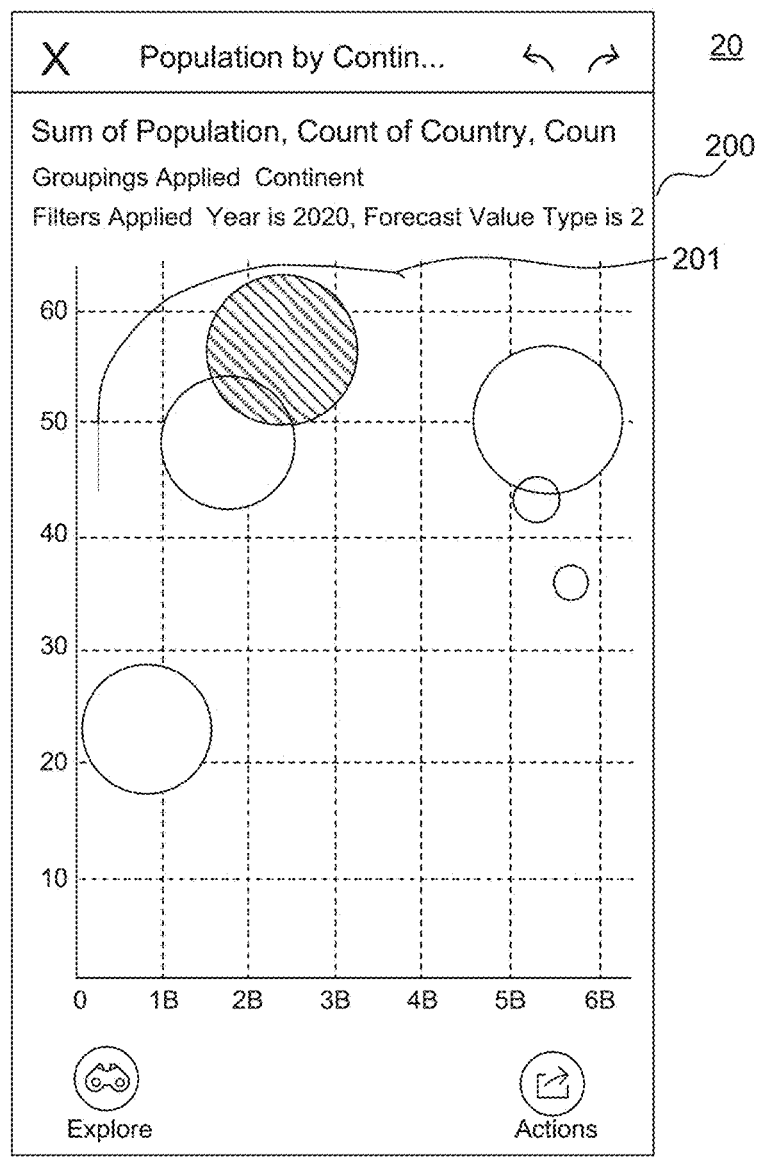
Figure 2F:
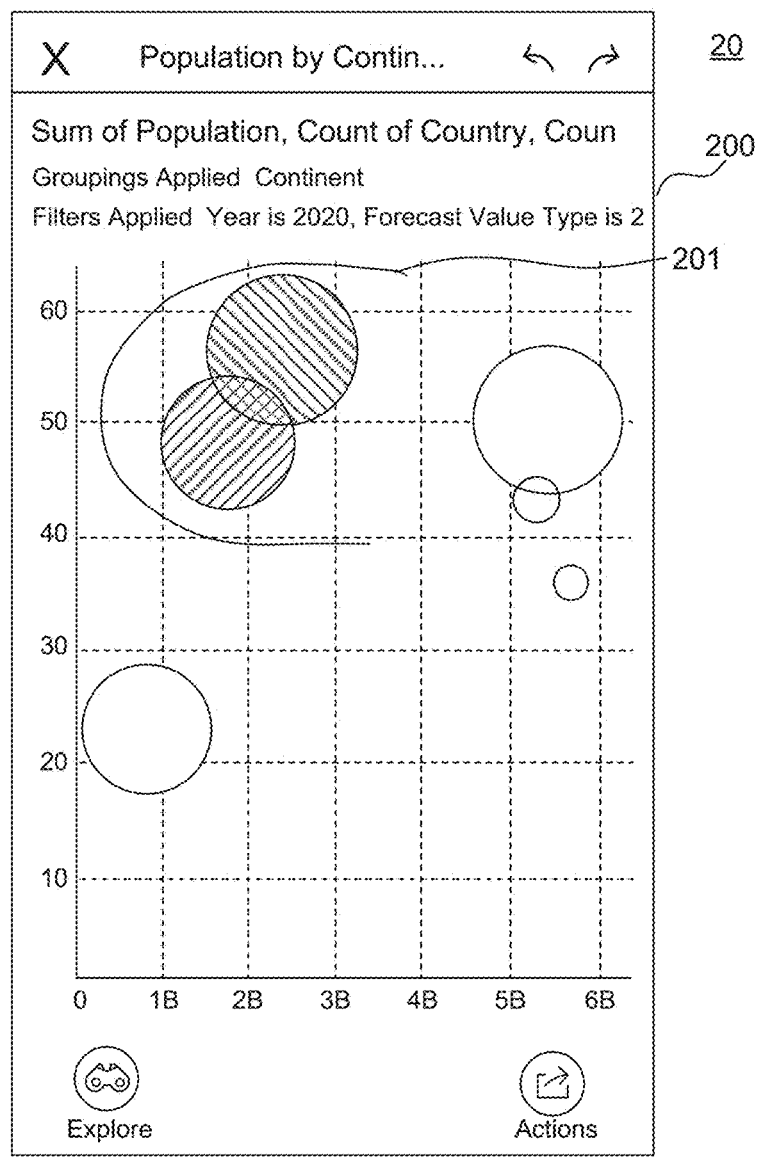
Figure 2G:
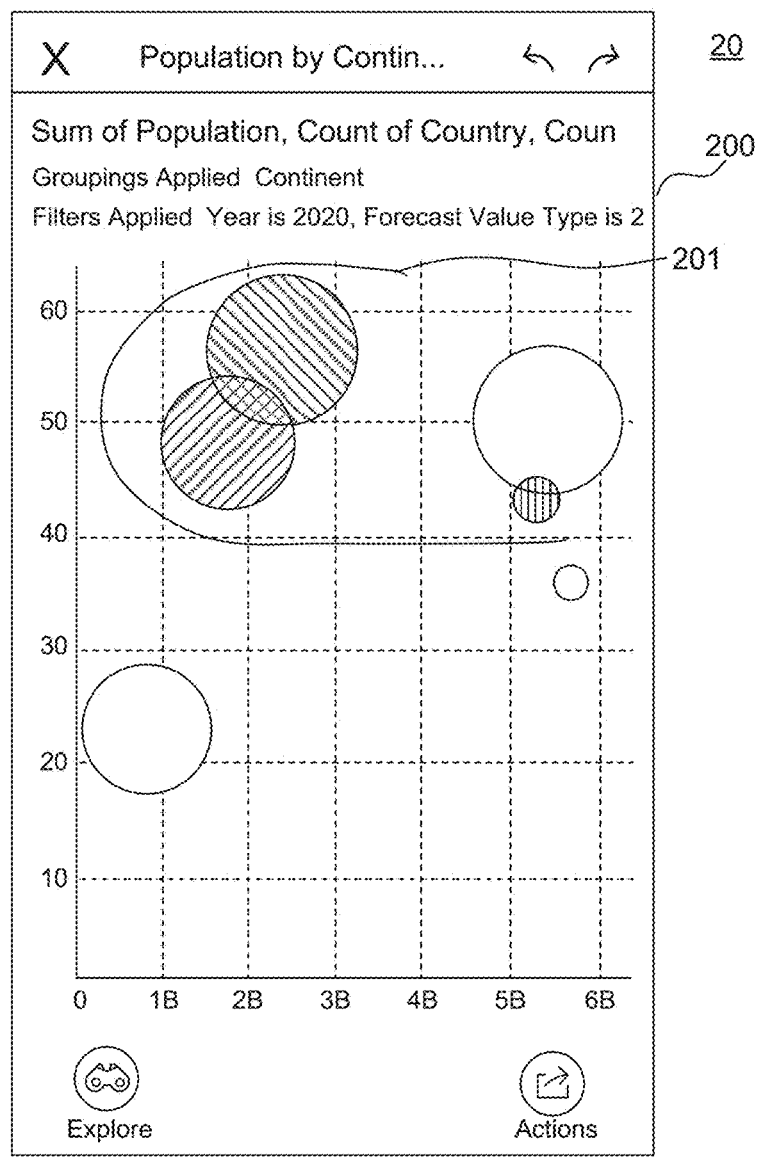
Figure 2H:
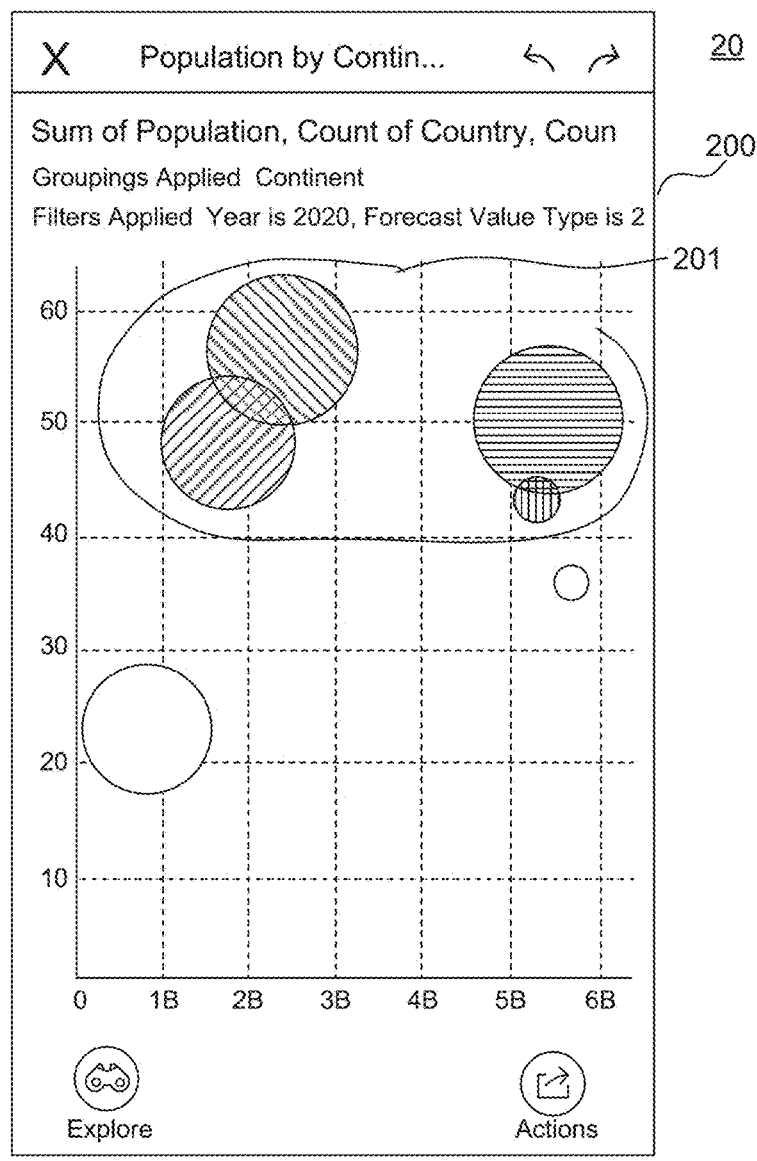
Figure 2I:
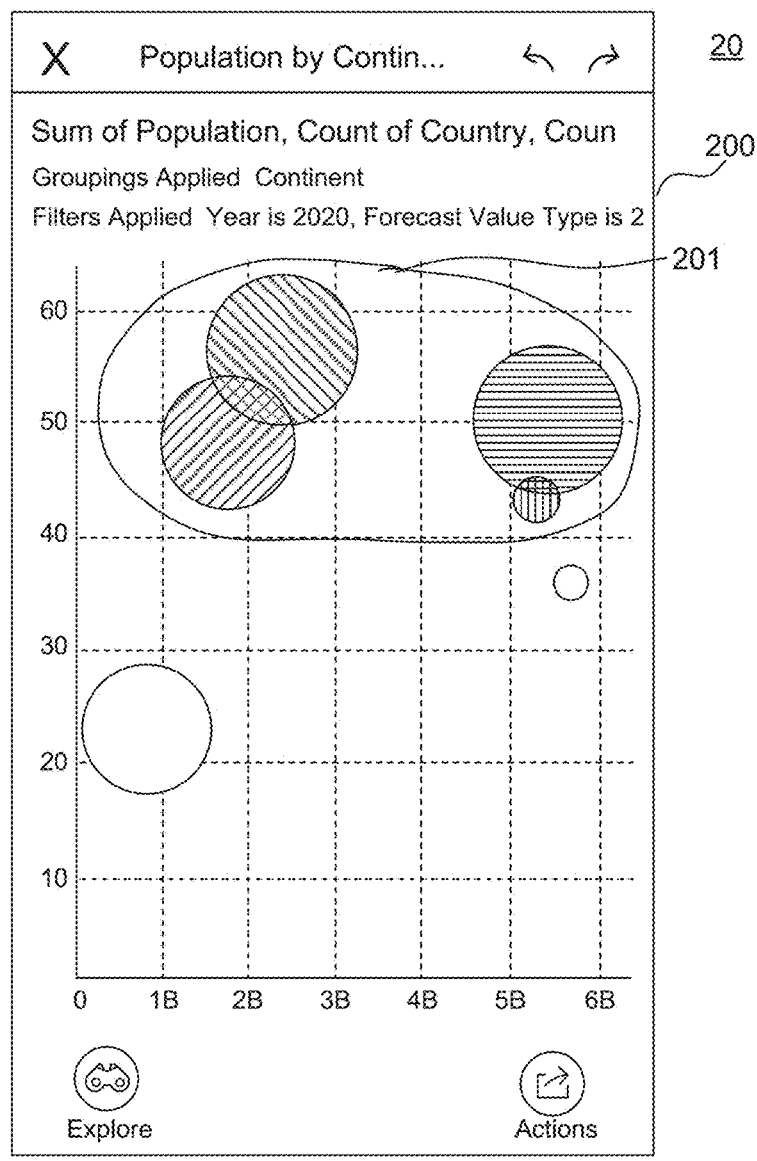
Figure 2J:
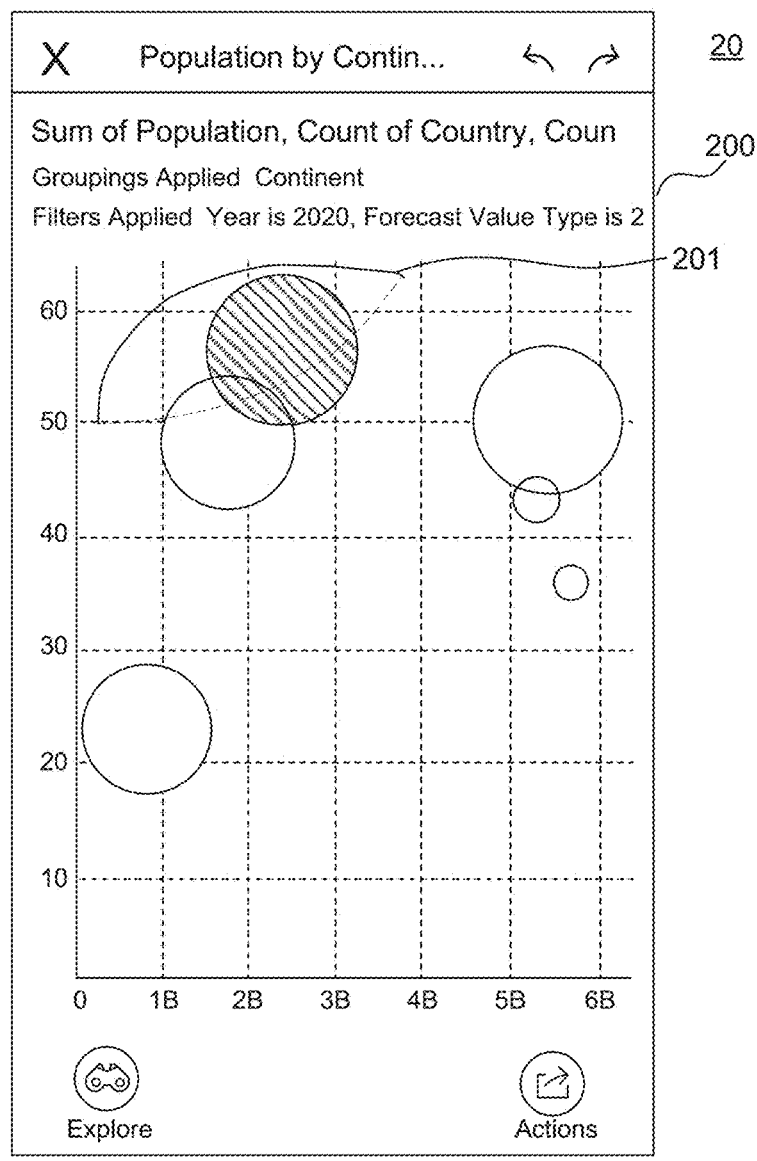
Figure 2K:
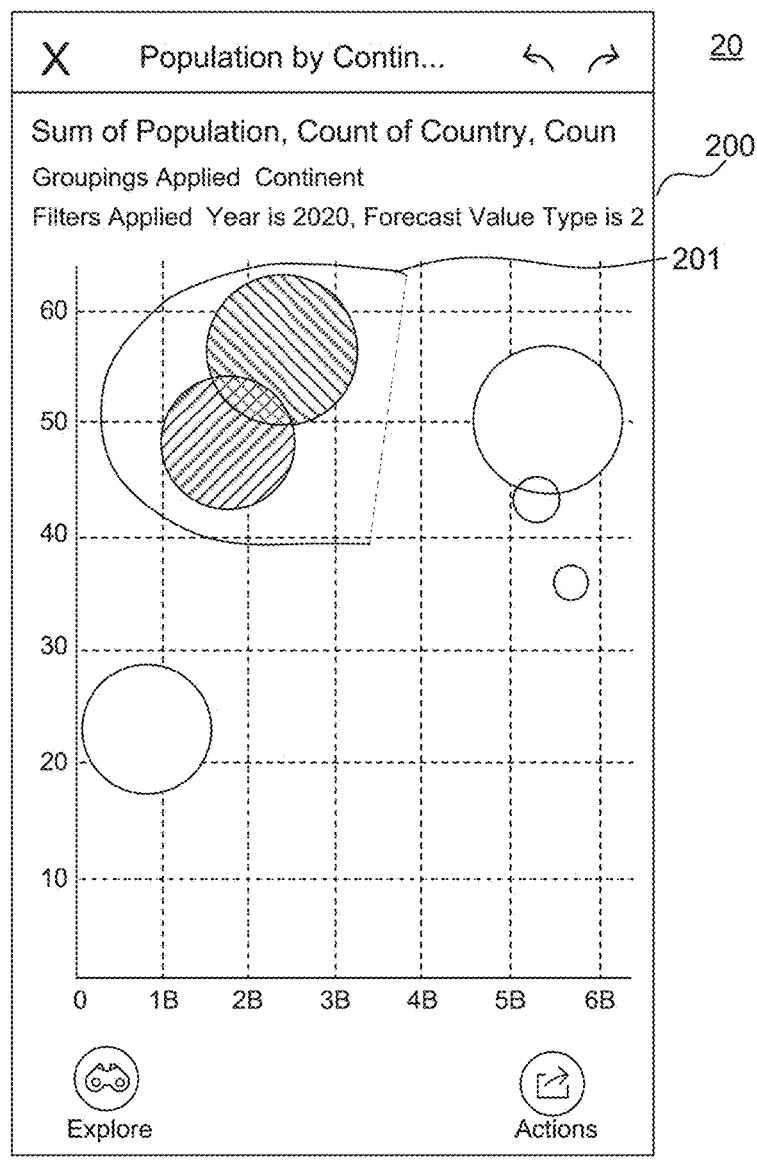
Figure 2L:
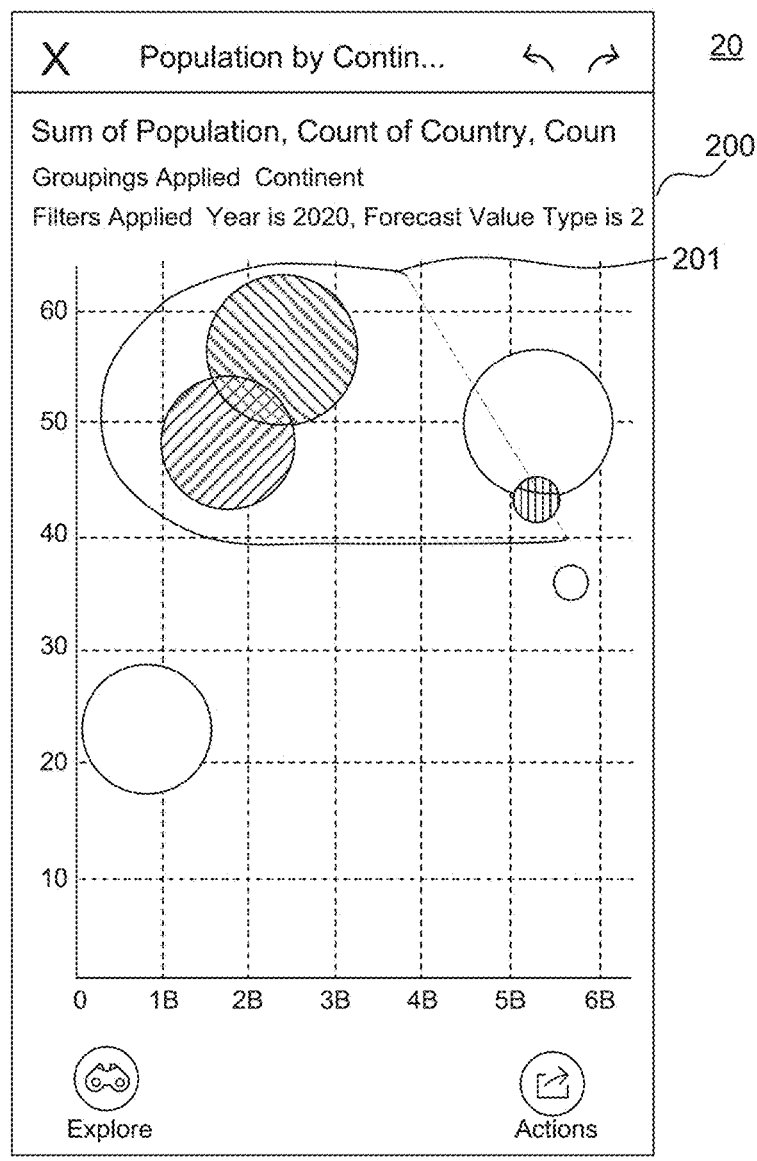
Figure 2M:
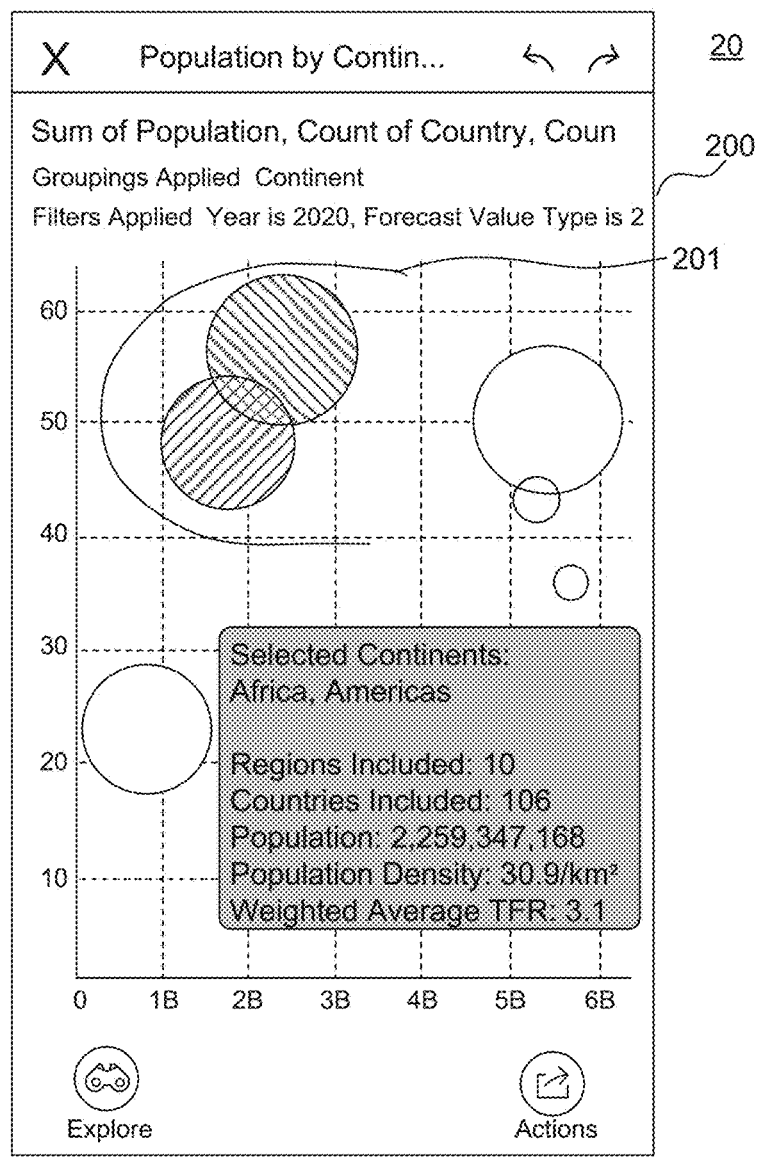
Figure 2N:
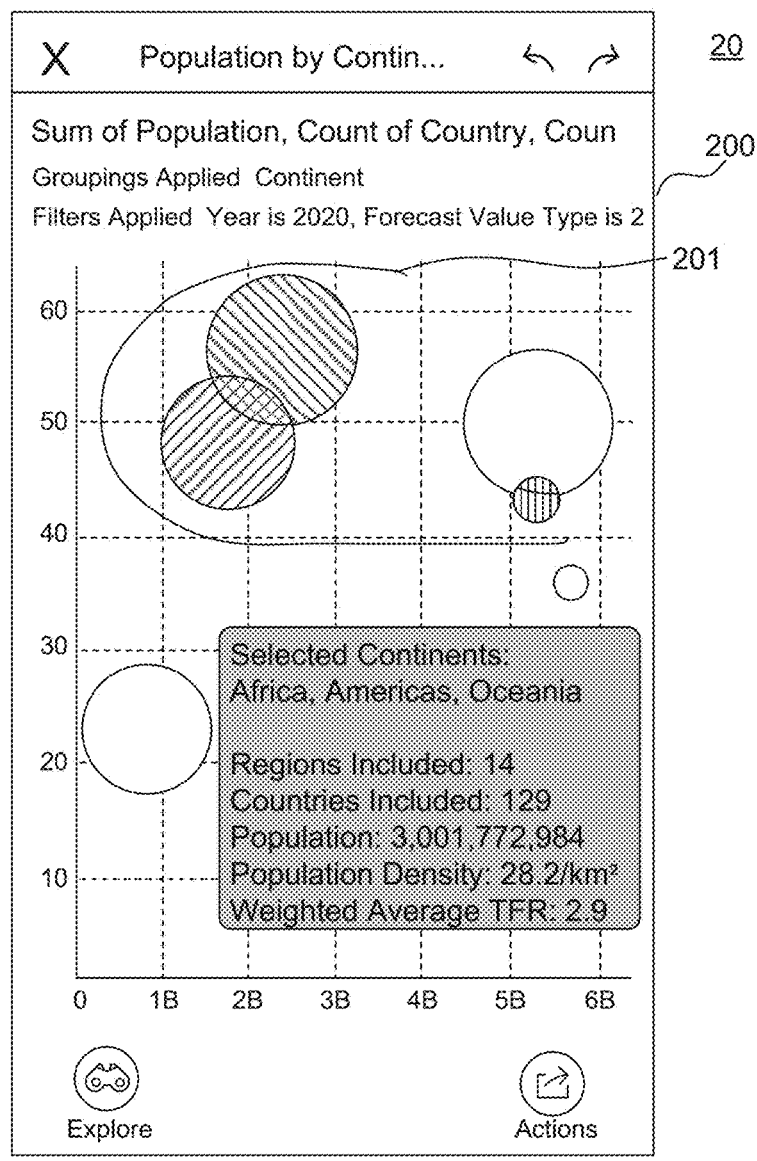

FIGS. 2A-2N demonstrate an animated action of selecting multiple elements on a bubble chart, according to an exemplary embodiment. An example of a drawing multi-selection in a bubble chart can be seen in FIGS. 2A-2N as a progression of select frames of GUI display 100, represented in FIGS. 2A-2N as GUI display 200.

FIG. 2A shows computer system 20 with GUI display 200, configured to allow selection of multiple elements, such as any set or subset of bubbles 202-212 as currently displayed or graphed on GUI display 200, such as via a multi-selection operation. The configuration of GUI display 200 to allow selection of multiple elements may, in some embodiments, be enabled by default and always on. In other embodiments, modal and/or contextual operation may be provided, utilizing modes, sub-modes, and/or contexts, as described above, which may further be indicated by other indicia on GUI display 200 of a present operating mode or context, for example.

FIGS. 2B and 2C show GUI display 200 with an additional console 216 portion, which may contain icons, virtual buttons, or other virtual knobs or handles for additional actions to be performed with the chart, elements, or data displayed; for example, saving changes or switching selection modes. Additional actions may also be possible, such as for computer system 20, including sharing links or snapshots.

Additional console 216 may be normally hidden, as in FIG. 2A, or it may be fully displayed, as in FIG. 2C, by default and/or at all times, in some non-limiting embodiments. When transitioning between the hidden state and the fully displayed state of the additional console 216, there may be a transitional animation such as in FIG. 2B, for example, sliding up from the bottom after being hidden and before being fully displayed, or sliding down to the bottom when going from being fully displayed to being hidden. Additional console 216 may appear on other sides or portions of GUI display 200, in other embodiments. The transition from being hidden to being displayed and vice-versa may be triggered by engaging a physical button on a peripheral device or on computer system 20, a virtual button, such as actions button 214, or by a gesture, such as swiping on a touch pad or touch screen, in a corresponding part of the touch pad or touch screen, to name a few non-limiting examples. Additional console 216 may be hidden by swiping in the opposite direction, engaging the same physical button or virtual button, or a different button, such as any of the other buttons on additional console 216 to perform a specific action, or another button specifically designated to hide additional console 216, such as close button 218.

In this illustrative embodiment of FIGS. 2B and 2C, there is a draw selection button 220, which may be used to toggle a mode or sub-mode for the drawing multi-selection operation. Draw selection button 220 may, in other embodiments, be located in a fixed position on GUI display 200, irrespective of additional console 216, as is the case with actions button 214, in this non-limiting exemplary embodiment. For embodiments in which drawing multi-selection is always enabled, such as without mode switching or contextual operation, draw selection button 220 may be absent from GUI display 200 entirely.

FIGS. 2D-2I show a drawing multi-selection operation, at selected frames of an animated display output of GUI display 200. For purposes of this illustrative example, it is assumed that a multi-selection mode was entered upon engaging draw selection button 220, upon which additional console 216 would have become hidden, either instantly (at substantially the same time) or by a transitional animation such as that of FIG. 2B.

FIG. 2D shows all bubbles as unselected and being substantially the same color. FIG. 2D additionally shows drawing multi-selection line 201. This state may be achieved, in some embodiments, by switching to a multi-selection mode or context, such as by pressing, tapping, clicking, or otherwise engaging draw selection button 220, or, in a mode or context allowing drawing multi-selection, by beginning to draw a drawing multi-selection line 201. In some exemplary embodiments, unselected bubbles may be displayed as a shade of gray, or in grayscale equivalents of their original colors.

Drawing multi-selection line 201 is also shown in an early stage in FIG. 2D. Drawing multi-selection line may be a line or curve drawn by computer system 20 in response to a user interaction. In some embodiments, this user interaction may be achieved such as by dragging a pointing device, such as a finger on a touch screen or touch pad, or moving a mouse or motion controller with a button held down, to name some non-limiting examples.

FIGS. 2E-2H show additional intermediate stages of drawing multi-selection line 201. In some embodiments, elements will be selected in real time during the period in which the drawing multi-selection line 201 is being drawn across GUI display 200, as described above. In some embodiments, as bubbles are selected, they may be restored from their unselected color(s) to their original color(s) as soon as they are selected.

Additionally, each intermediate stage of FIGS. 2E-2H shows a different set of elements selected based on the present shape of the drawing multi-selection line 201, specifically the area enclosed by a closed shape bounded by drawing multi-selection line 201 and, if drawing multi-selection line 201 does not already form a closed shape, an interpolation line or curve (not shown) between the end point and start point of multi-selection drawing line 201. As described above, such an interpolation could be a straight line between the start and end points of drawing multi-selection line, or could be a spline curve in accordance with other parameters for intuitively smoothing completion of a selection area.

FIGS. 2E and 2G show an open (partial) drawing multi-selection line 201 selecting certain elements having their respective centers of mass fall within a selection area enclosed by drawing multi-selection line 201 and the interpolation line or curve between the start and end points of drawing multi-selection line 201. For example, in FIG. 2E, element 202 is selected, while element 204 is unselected; in FIG. 2G, element 210 is selected, while element 208 is unselected. The unselected elements near the selection area remain unselected because their centers of mass remain outside the selection area as defined by drawing multi-selection line 201 and any interpolation between start and end points of drawing multi-selection line 201. FIG. 2F provides another example of how an open drawing multi-selection line 201 is completed in the meantime.

FIG. 2I shows a closed drawing multi-selection line 201, enclosing a selection area that encompasses multiple selected elements. The selected elements have all returned to their original colors (shown in FIG. 2A), while the unselected elements are still in their respective unselected color(s).

Corresponding to FIGS. 2E-2G are FIGS. 2J-2L, in which each of FIGS. 2J-2L shows a broken line representing interpolation lines or curves between start and end points of drawing multi-selection line 201. FIG. 2J shows a non-linear interpolation, roughly mirroring the drawing multi-selection line about an axis of a linear interpolation. FIGS. 2K and 2L show a linear interpolation, as a straight line between the start point and end point of drawing multi-selection line 201. In the embodiments of 2E-2G, for example, these lines are not visibly drawn on GUI display 200. FIGS. 2J-2L depict these interpolation lines or curves for illustrative purposes; although, for simplicity of design, these lines or curves are not shown as being drawn the same as drawing multi-selection line 201, they may be visibly rendered in some embodiments, to provide additional clarity to the user.

Corresponding to FIGS. 2F and 2G are FIGS. 2M and 2N, in which each of FIGS. 2M and 2N shows a popup balloon featuring results of various processing operations on data corresponding to the selected elements. In this non-limiting example, the indication is a plurality of values representing, for example, statistics or other attributes of the selected set of corresponding data elements. For example, names associated with each element may be echoed here ("Africa" or "Oceania," etc.). Other displayed results may represent aggregate statistics of the selected set of data elements, e.g., a sum total of a certain value pertaining to a field of corresponding data underlying each selected segment, across all selected segments, such as population, countries, regions, etc., encompassed within the selected "continent" elements. In other embodiments, the result(s) may be displayed anywhere on GUI display 200, including in a dialog, a window, a dedicated section of the display, on a separate external display, or by other output means, such as output being programmatically passed to another program or function separate from the GUI.

In some embodiments, this field may be common to each element, each element having a set value. In other embodiments, the value of the field may not be specifically set, and may have a defined default value. The values may be retrieved, in some embodiments, by the database query generated in response to one of the multi-selection operations described above.

The underlying data of each element, as may be inferred from the above two paragraphs, may be, in some embodiments, simple numerical or string values. However, in other embodiments, each element may represent a data structure with virtually unlimited relations and associated values. In this example, each bubble may represent a continent, with each continent having multiple quantitative and qualitative attributes that may be retrieved by the database query generated by the multi-selection operation. The retrieved underlying data may be analyzed, formatted, and presented in any variety of ways.

The results displayed may be of processes and calculations of virtually unlimited complexity. Aside from simple summations and statistics, there may be other relationships measured and output, such as cumulative population density, weighted averages, such as of total fertility rates (TFR), or may be results of virtually any other mathematical formula, function, operation, transform, etc., to name a few non-limiting examples.

Once the values have been retrieved, additional processing may be performed, such as arithmetic operations, statistical operations, other mathematical transforms, or display formatting, to name a few non-limiting examples. Similar processing may be performed here. Results of the processing may be displayed and updated in substantially real time as multiple elements are being selected (or de-selected) in a selection or multi-selection mode, sub-mode or context. Alternatively, such processing and display of results may be performed upon a switch of mode, sub-mode, or other context, without updating in real time as the number of selected elements changes.

Figure 3:
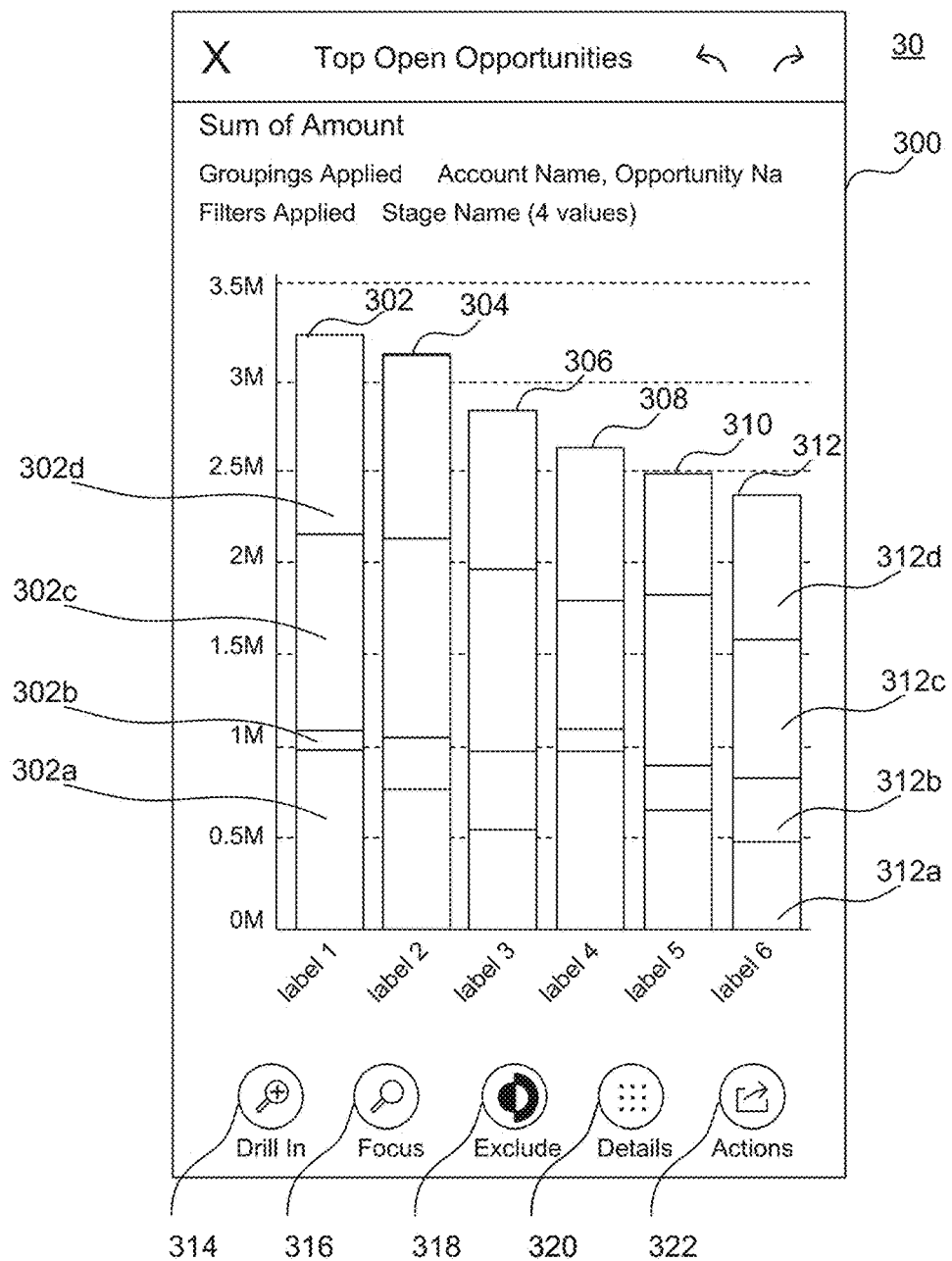
FIG. 3 is an example simulated GUI demonstrating a stacked bar chart, according to some embodiments.

FIG. 3 is an illustration of an exemplary graphical user interface (GUI) having support for multi-selection in a chart, according to an example embodiment of a stacked bar chart. Depicted in FIG. 3 is the visible area of a GUI display 100 on a computer system 10. In this exemplary embodiment, a set of graphical elements (stacked bars, or bars of stacked segments) 302-312 may be arranged in a graphical representation of underlying data or data sets. Each bar 302-312 in this exemplary embodiment has four segments a-d, thus forming 302a-d through 312a-d as shown. 304a-d, 306a-d, 308a-d, and 310a-d are additionally shown, even though the drawing does not show corresponding reference numbers for these segments. Data elements or groups of like data elements, each being graphically represented by a segment, and which may appear in the GUI display 300, or which may be hidden depending on a view of the GUI display 300, which may be panned and/or zoomed such that not all available bars or segments may be visible. One of ordinary skill may appreciate that, although this exemplary embodiment only shows stacked bars 302-312 for illustrative purposes, actual implementations may allow any number of bars and segments to be displayed in GUI display 300.

Bars and/or segments may include any color scheme or shading, and may further be of various shapes and/or orientations as rendered on GUI display 300 of a computer system 30, such as by scaling bitmaps or vector graphics, in some embodiments. Additionally, shapes may be filled, opaque or with various degrees of transparency, or textured (e.g., with icons, images, patterns, photographs, etc.), may have contrasting colors at borders of any width, and may also have shading effects for three-dimensional ("3D") or pseudo-3D rendering. For the purposes of this exemplary embodiment, bars and segments will be rectangular, with contrasting shading of segments within bars, and like shading for corresponding segments across bars.

Optionally, in some embodiments, bars may be arranged across a coordinate axis or coordinate axes, in a one-, two-, or three-dimensional coordinate system. In addition, in the same or other embodiments, tick marks, grid lines, and any legend(s) may also optionally be displayed to facilitate a viewer's understanding of a given scale of a visual representation. Such tick marks, grid lines, and/or legend(s) may be displayed underlying the graphed elements (shown) or may be overlaid, with varying degrees of transparency. Coordinate axes may represent any quantifiable aspect of the underlying data, and may be on any scale, e.g., linear, logarithmic, exponential, etc. As each element of the underlying data may have a practically unlimited number of different attributes and quantifiable aspects, a coordinate axis may represent any one of such quantifiable aspects, and any coordinate axes may be selected and changed at any time according to user input or other preference setting. Scale of coordinate axes may also be adjusted arbitrarily, or automatically fit to GUI display 300.

Bars or segments may be of fixed size, or may scale in size, color (hue, brightness, saturation, or other chromatic value), transparency, border dimensions, shape (e.g., elliptical axis, polygon sides, etc.), or any other visual aspect, corresponding to a quantifiable aspect of the underlying data, which may be different from other quantifiable aspects defining any coordinate axes. Bars or segments on a coordinate axis or coordinate axes may be arranged such that the center of mass of each bar or segment aligns with its corresponding point or line on each coordinate axis, as is shown in this exemplary embodiment of FIG. 1; however, any other representative point of a bar or segment may be used consistently across a visual representation arranged along any coordinate axis or axes.

Regarding selection of multiple elements (segments, in this case), a given GUI may provide several types of operations to accomplish the same result. In an example embodiment, the GUI may operate in at least one of a variety of modes, including a browsing mode (also called a viewing mode or exploratory mode) and at least one selection mode. One selection mode, for example, may be an exclusive selection mode, allowing active selection of only one element at a time: an element may be selected, but selection of a different element will automatically de-select the previously-selected element, similar to a radio button element in other various types of user interfaces. By contrast, a multi-selection mode may allow for selection of multiple elements while the multi-selection mode is enabled. Such multiple selection may be simultaneous or sequential, but may persist at least as long as the multi-selection mode is enabled.

As a practical example, modal operation is described, which may allow the GUI to switch from one mode to another, e.g., browsing mode to exclusive selection mode to multi-selection mode, and such mode switching may be configured to occur in a set linear sequence, a stack-type sequence (first in, last out), or in no particular sequence (directly switching to an arbitrary mode, e.g., by pressing a button or selecting a menu item or icon).

Modes may additionally be hierarchical along these lines, having main modes and sub-modes, whereby it may be possible to switch sub-modes within a main mode, also switching between main modes regardless of any sub-mode state within a main mode. Sub-mode states may be persistent across switching of main modes, or sub-modes may alternatively reset to a default with any main mode switch. Sub-modes may be treated as contexts, in some embodiments, which may not need to be expressly invoked, switched on, or otherwise activated, but rather contextually enabled while a certain other action is being performed, or when a certain area of the screen is used for what would otherwise be a selection, for example.

It is alternatively possible, however, to have a multi-selection-enabled GUI without any other modes, thus having multi-select chart capability always on. For illustrative purposes, any such multi-selection operation as described in this paragraph will be referred to in this description as being in a multi-selection mode.

In a multi-selection mode, the number of elements that may be selected at a given time may be limited to a finite number or within upper or lower bounds (e.g., up to five elements, exactly four elements, at least three elements), in some embodiments. Alternatively, the number of elements that may be selected at a given time may be limited only by other system limitations, such as data type; in other words, a multi-selection mode without any explicit limits on a number of elements to be selected at a time may thus allow for a virtually unlimited number of elements to be selected.

For specific examples of how multiple elements may be selected in FIG. 1, it may be possible in a multi-selection mode to perform sequential multi-selection, i.e., selecting a single element, then subsequently selecting another single element, and repeating these steps until all desired elements are selected. However, depending on the density or complexity of a given chart, or in cases in which the number of desired elements to be selected is relatively large to the extent that sequential multi-selection would be uncomfortably time-consuming or difficult, it may also be possible in a multi-selection mode to perform a drawing multi-selection (also called a free-form selection or lasso selection), thereby quickly and efficiently encompassing a relatively large selection of elements with what is essentially a single intuitive operation for a user to perform.

Drawing selection may be performed in a multi-selection mode that is the same multi-selection mode in which sequential multi-selection may be performed, in some embodiments. In other embodiments, mode selection may be configured to require explicit selection of a drawing selection mode. In a multi-selection mode configured to allow both sequential multi-selection and drawing multi-selection, in some embodiments, drawing multi-selection may be initiated when a user performs an action tantamount to selecting an empty part of the chart using a pointing device, such as a finger on a touch screen or touch pad, mouse, motion controller, motion sensor, position sensor, light sensor, etc., followed by a dragging operation. In other embodiments, drawing multi-selection may begin with selection of at least one element and continue in the same way as if the first selection had been directed to an empty part of the chart. The drawing multi-selection operation including a dragging operation is further described below.

In some embodiments, the dragging operation may involve holding or locking a button or other active selection state of the pointing device and moving the pointing device while the button is held or locked in the active selection state. When the pointing device is moved, in some embodiments, a trail or tracer may follow a pointer or cursor such that a line or curve is drawn across the chart. The line or curve may be a free-form drawing, which may enclose or encompass multiple graphical elements representing data elements on the chart.

In some embodiments, the free-form drawing need not be completed by the user to the extent that the user would have to draw a completely enclosed area or space, but instead may be left open by the user. In the case of such an open drawing multi-selection, the computer system 30 may be configured with logic to interpolate a closing segment between the end point of the free-form drawing and the start point of the free-form drawing, either as a straight line between the two points (linear interpolation), or as a spline between starting and ending segments of the free-form drawing (spline interpolation), so as to maintain a smooth shape that may be more intuitively what the user would expect, in some embodiments.

Such interpolation features would allow a chart configured to support multi-selection thus to be forgiving and accommodating where users may not always be able to draw a neat and precise shape around all desired elements. Interpolation features such as these would therefore also be especially useful as accessibility features that may assist users with visual impairments or limited motor control, for example.

Once the drawing multi-selection operation is completed, either by the user directly or by computer system 30 having performed an interpolation operation, then any intervening range of elements inside the completed free-form drawing may be selected. If all desired elements are selected as a result, then the user may carry on with additional or separate operations. In some embodiments, the intervening range of elements enclosed by the free-form drawing may include all elements inside the completed free-form drawing selection.

However, if there are additional desired elements outside of what has been selected at this point, the user may, in some embodiments, perform sequential multi-selection operations to include further elements in addition to the elements already selected by drawing multi-selection, without de-selecting the existing selection. In other embodiments, depending on the multi-selection mode(s) or sub-mode(s) available in the GUI, or additional buttons, button combinations, or gestures available on the computer system 30 or in the GUI, the user may continue with another drawing multi-selection, again without de-selecting the existing selection and without switching modes.

Similarly, if the drawing multi-selection has encompassed a few extraneous elements other than the desired elements, then such elements may be excluded or de-selected, such as by a different button, button combination, or gesture on the computer system 30 or in the GUI, or by switching to a de-selection sub-mode or main mode. In a de-selection mode, de-selection may be performed in the same manner as selection, and similarly for multi-de-selection as with multi-selection. In some embodiments, the multi-selection mode may have sub-modes both for selection and de-selection of multiple elements.

Adding to these supplemental steps of selection and de-selection after a multi-selection, including after a drawing multi-selection, each subsequent selection or de-selection, including each subsequent drawing multi-selection and equivalent de-selection operation, may be preceded by any combination of panning, scrolling, or zooming operations to facilitate subsequent selections or de-selections, especially of smaller or more densely grouped elements.

It is additionally possible to select or de-select elements not only by expressly indicating which elements are to be selected or de-selected, but also by an action of inverting an existing selection, in some embodiments. For example, if a user wished to select all but one out of a large number of elements, the user may be able to select all elements, and then de-select the one not desired for selection. Using an action to invert selection, in an embodiment, the user instead could select the one element not desired, then invoke the action to invert the selection, which in turn would select all elements that are not presently selected, and de-select all elements that are presently selected. Such a selection inversion action allows for easy viewing of and switching between complementary data sets, for example, quick views of statistical summaries for both X and non-X elements of the dataset, in an example where all elements X are selected as a subset of the dataset graphed in the corresponding chart.

As each element or group of elements is selected or de-selected, GUI display 300 on computer system 30 may further display or modify selection indicia, which in some embodiments may include new or modified properties of displayed graphical elements such as size, color (hue, brightness, saturation, or other chromatic value), transparency, border dimensions, shape (e.g., elliptical axis, polygon sides, etc.), or any other visual aspect, corresponding to a quantifiable aspect of the underlying data. The same changes to selection indicia effected with a selection may be reversed for a de-selection, or they may be modified in another manner consistent with de-selection operations in any given mode or sub-mode.

Additionally, as elements are selected, values pertaining to any attributes or quantifiable aspects of the selected elements may be displayed on GUI display 300, or output via any other means, including but not limited to a separate display on a separate device, other visual, audible, or tactile means, other programmatic or computer readable output such as via an application programming interfaces (API), socket, shared memory, hardware port, printer, etc.

Further, as each element or group of elements is selected or de-selected, computer system 30 may perform analysis of the data elements corresponding to the selected elements, including analysis of any other quantifiable aspects of these selected data elements not displayed on the chart, according to some embodiments. Such analysis may commonly comprise statistics, trends, regressions, etc., but these examples are not limiting. As with the above display or output of corresponding values from the underlying data, there may be a similar display or output of results of the analysis performed on the selected data elements.

Other graphical representations accompanying a selection of elements, such as animations, trails, flashing, badges superimposed over selected or non-selected elements, grayscaling, color fading, or color inversion, to name some non-limiting examples, may optionally accompany the multi-selection shown here. Any of the above may be considered indicia of selection for elements displayed on a chart, visually differentiating selected elements from non-selected elements.

Regarding underlying platform technology, in an embodiment, such GUI display 300, including charts or graphs and user interface for selection, de-selection, and related actions, may be part of software on computer system 30, which may be integrated with or communicatively coupled to a display device (not shown). The software may be a native application, modular or separately installed from an operating system, or alternatively integrated with an operating system running on computer system 30, or otherwise bootable on computer system 30, in some embodiments. The software may be executed and run alongside other software in a multitasking environment. In some embodiments, the software may be, or may be part of, a web application running in a web browser or comparable software platform. The application may execute entirely in a web browser, including some embodiments as a progressive web application (PWA). In other embodiments, the application may be a hybrid application, executing parts of program code both within a web browser or comparable software platform runtime environment, and executing parts of program code natively on the underlying computer system 30.

Regarding implementation details of the charts per se, the charts may be visual representations of entries in a database, such as rows in a column-oriented database, to name a non-limiting example in some embodiments. A database may be any representation of data relating certain quantifiable aspects of data to other quantifiable aspects or other attributes of data entries in a dataset or database. A dataset or set of data may be an entire database, a subset of a database, or may encompass multiple databases or subsets thereof. A database or dataset may be a flat text file, comma-separated values (CSV), key-value pairs, or other structured text or binary data conforming to any of a variety of database standards or other formats, in some exemplary embodiments. In one illustrative example, an application may have a list of data entries, each rendered as a graphical element, such as with any of bars 302-312. The list of data entries rendered may have been read from a stream or file containing the entire list formatted in JavaScript Object Notation (JSON), to give one non-limiting example.

Charts may be rendered in various stages, in some embodiments. For example, depending on a set of data to be rendered, a relative scale and window may be manually or automatically configured, so as to have a meaningful set of coordinate axes on which to display data within the GUI display 300, in some exemplary embodiments. Next, or at substantially the same time, points indicating center of mass or other representative points of bars or segments may be pre-rendered. Subsequently, or at substantially the same time, any remaining visual representation of elements may be rendered, such as full-size or scaled bars or segments, colors, textures, graph lines, etc. In some embodiments, the speed of these rendering stages, in sequence or parallel, maybe sufficiently fast such that a user may not be able to discern separate steps of pre-rendering and final rendering, for example.

It can be appreciated that actual selection actions may be done in a variety of ways. In some embodiments, for example, elements may be selected by activating a pointing device pointing to within the visually rendered area of an element on GUI display 300. As a familiar example, activating a pointing device pointing to within the visually rendered area of an element on GUI display 300 may involve clicking a mouse while a pointer or cursor corresponding to the mouse overlaps the rendered area of the element to be selected. Another familiar example may be of touching the element with a finger on a touch screen. Any other comparable actions are possible, such as with touch pad (including use of a stylus or other touch device), motion controller, motion sensor, position sensor, light sensor, etc. Activations may be with a button press or click, tap, long press, drag, flick, or virtually any other action or gesture.

In a similar fashion, directly selecting an element that is too small to be easily pointed to on the GUI display 300 may be facilitated by GUI handles, visible or invisible, or by having virtual sizes of elements larger than the displayed size (physical size) of an element on GUI display 300. For example, in an embodiment with only a touch screen, to select a small element that is represented by only one pixel rendered, this small element may have a selectable virtual size of a circle with a radius of approximately ten pixels in any direction, so as to facilitate selection of this small element with a finger on a touch screen, in some embodiments. Similarly, when activated on a touch screen, or when a pointer or cursor draws near, such as with a mouse, motion controller, or other sensor, the a graphical element of the virtual size may be rendered visibly, corresponding to the data element of the original graphical element to be selected. Separately or in addition, such a candidate element for selection may be highlighted or otherwise indicated with separate indicia for possible selection in this manner.

In addition to directly selecting any one element, multiple elements may be selected, either in a multi-selection mode, sub-mode, or context, or by default. In some embodiments, as a user draws a free-form selection boundary line around an area of the GUI display 300, computer system 30 may determine, afterwards or simultaneously, which elements fall within the area enclosed by the boundary line. This determination may be made, in some embodiments, by determining intersection of selection position data corresponding to the selection with display position data corresponding to the elements. Position data corresponding to the elements may, in some exemplary embodiments, include pixel data corresponding to final rendered area of the elements, or pixel data corresponding to the pre-rendered points as described above, for example. Each of the position data (pixel data) may be uniquely related to an underlying data element.

In some embodiments specifically relating to segmented or stacked bar charts, special behavior for multi-selection may be configured, such that selection of certain segments or sequences of certain segments may result in entire intervening bars being selected with all of their component elements, with the intervening range of all segments in each intervening bar. For example, in some embodiments, multi-selection of elements 302*d* and 304*d* may also consequently result in elements 304*a-c* also being selected, in certain modes, sub-modes, or contexts. In other embodiments, the entire bars 302 and 304 may be selected in this manner, with all of their component segments, in certain modes, sub-modes, or contexts. In yet other embodiments, only the selected elements may be selected, such as with the drawing multi-selection of the bubble charts in FIG. 1 and FIGS. 2A-2N, for example.

Data elements corresponding to the graphical elements selected in this way thereby form the selected dataset. The selected dataset may be generated, in some embodiments, by first creating a set or list of the selected pixel data and/or uniquely related underlying data elements, using an internal representation or notation that may be ordinarily passed between programmatic elements, for example, JSON-formatted data. Such a list of selected pixel data or uniquely related underlying data elements may also then be used to form a database query crafted to return or retrieve other relevant portions of the selected dataset from the corresponding database(s), corresponding only to selected entries, in some exemplary embodiments.

In addition, the relevant data returned by the query derived from the selection may be fed into other functions for further analysis, in some embodiments. For example, for each value of a certain field of every row of the dataset of selected elements, it may be possible to calculate certain statistics, such as at least one of a sum, mean, median, range, variance, or standard deviation, to name some non-limiting examples. Additionally, there may also be correlations to other datasets or to all displayed data as a whole, which may further include generating regression curves within the selected region of GUI display 300, or other displays of local and/or temporal trends, in various embodiments.

In some embodiments, selected pixel data may be determined in substantially real time, generating a new database query each time the number elements in the selected pixel area changes. As new data are returned for selected elements with each query, the further analyzed values may also be updated in substantially real time. Additionally, as the selection changes in this manner, so would be any calculated statistics, correlations, regressions, or trends, such as those of the exemplary embodiments described immediately above.

As a selection changes, indicia of selection as displayed on GUI display 300 may be updated in substantially real time. In addition, any calculated statistics, correlations, regressions, or trends may also be displayed on GUI display 300, in textual and/or graphical form(s), and may also be updated in substantially real time as the selection changes. Such textual representations may be displayed in a separate window, frame, or pane, apart from any graph section of the chart, in some embodiments. Alternatively, textual representations may be displayed in a pop-up balloon, dialog, or other similar overlay superimposed on any graph section of the chart, in other embodiments. Graphical representations of statistics, correlations, regressions, or trends of the selected data may also be displayed in a separate graph or chart, or instead may be superimposed on the chart of GUI display 300 at substantially the same time as the selection is being made on the same display.

In a case of a touch screen, motion controller, or similar input device, without relying on other peripheral devices for user input, GUI display 300 may include icons, virtual buttons, or hotspots for selecting actions or switching modes or sub-modes, etc. In some embodiments, icons or virtual buttons may further include indicia of a current mode, sub-mode, or context, and/or an action currently being performed or about to be performed.

In a case of a mouse, touch pad, motion controller, or other sensor-based input device, a pointer or cursor may also be visibly displayed on GUI display 300 to facilitate pointing and selection, especially for drawing multi-selection operations, in some embodiments. Use of such a pointer or cursor may optionally be present with a touch screen, such as for an added accessibility feature, although it would not be necessary in the case of the touch screen generally.

Figure 4A:
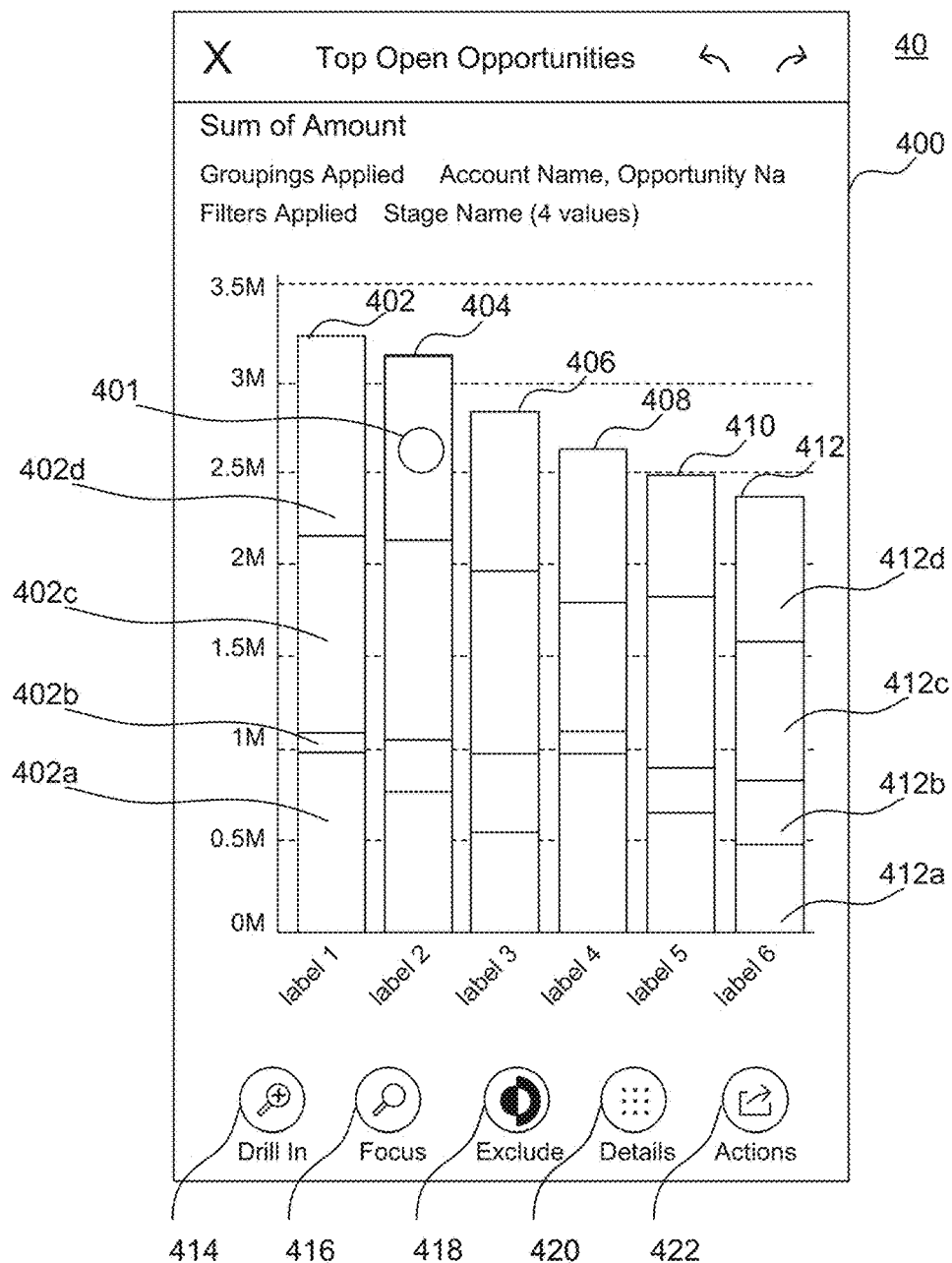
FIGS. 4A-4S demonstrate an animated action of selecting multiple elements of a stacked bar chart, according to some embodiments.
Figure 4B:
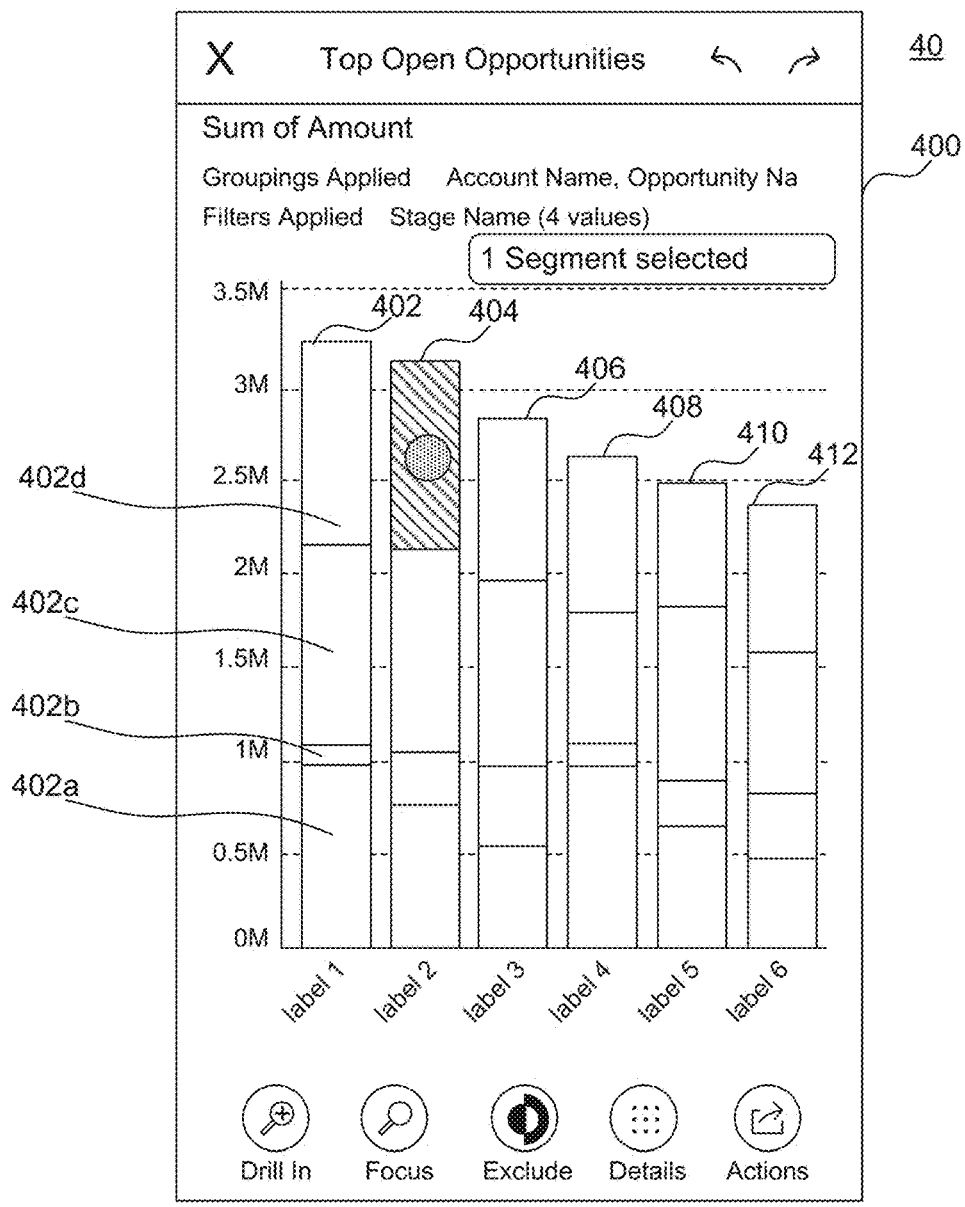
Figure 4C:
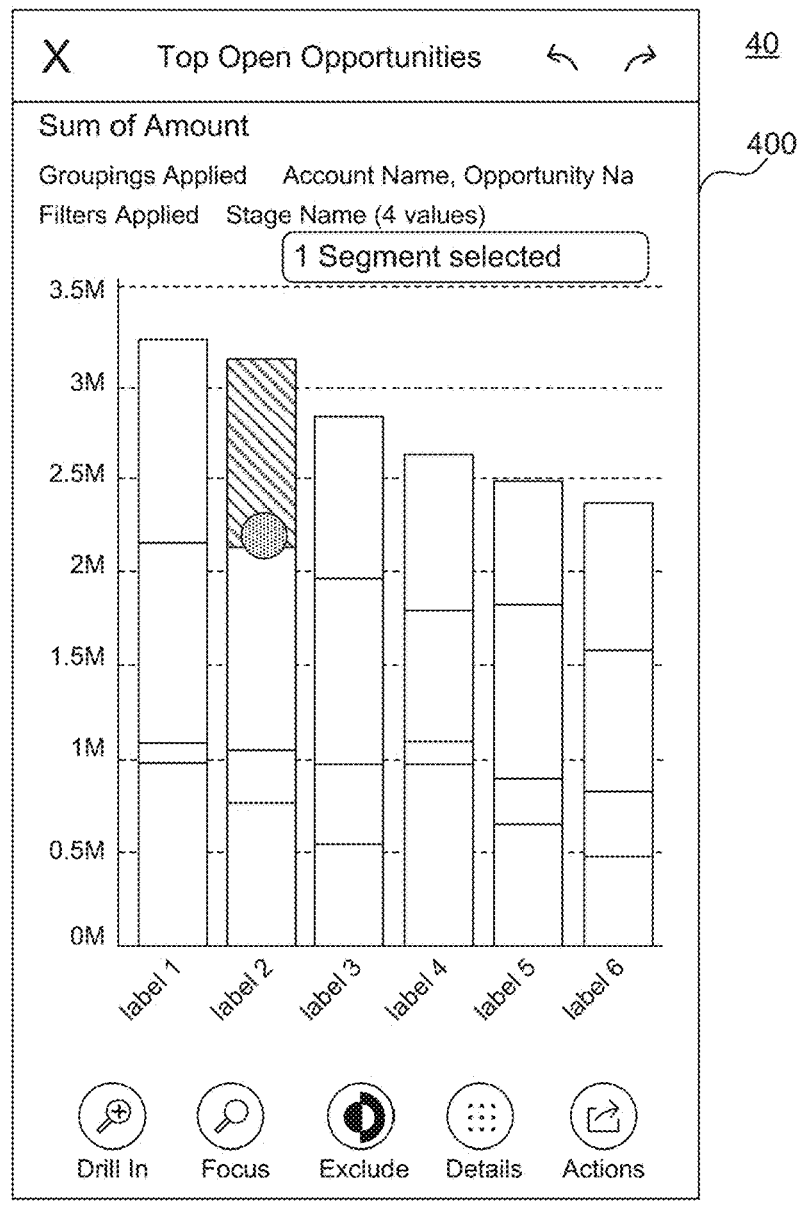
Figure 4D:
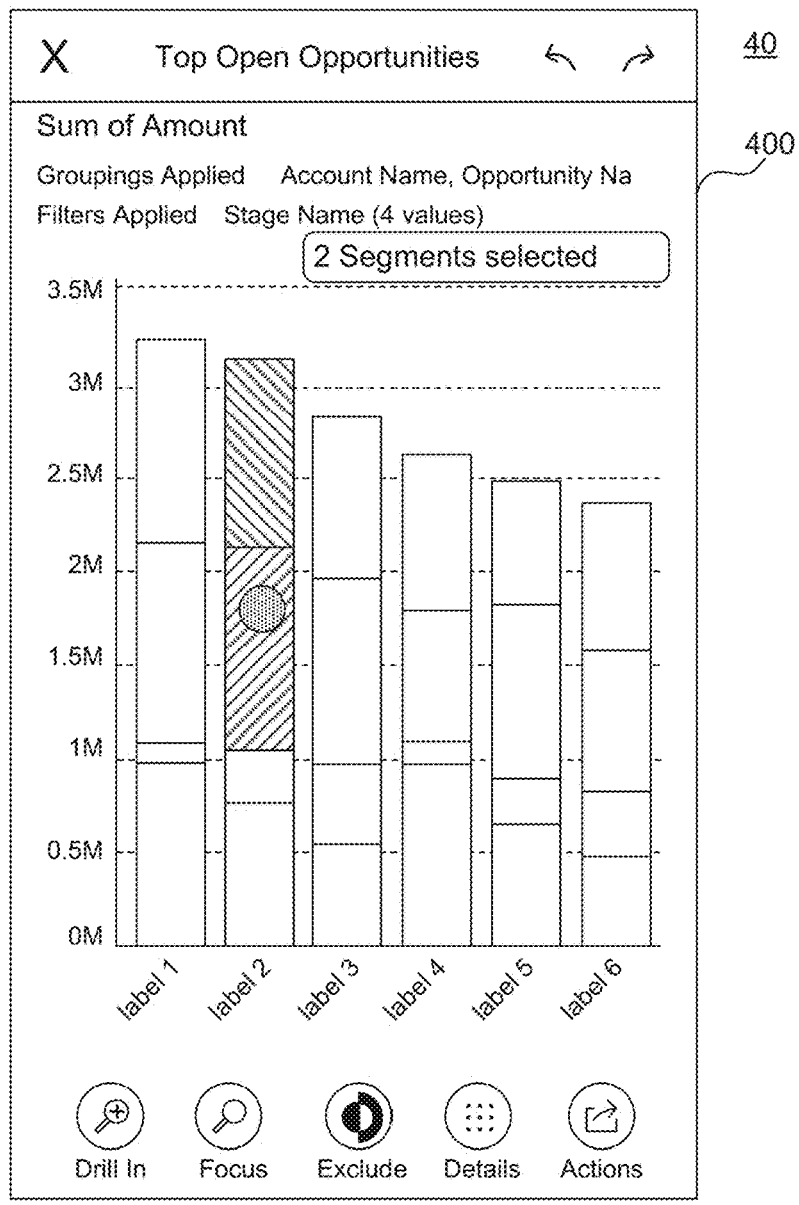
Figure 4E:
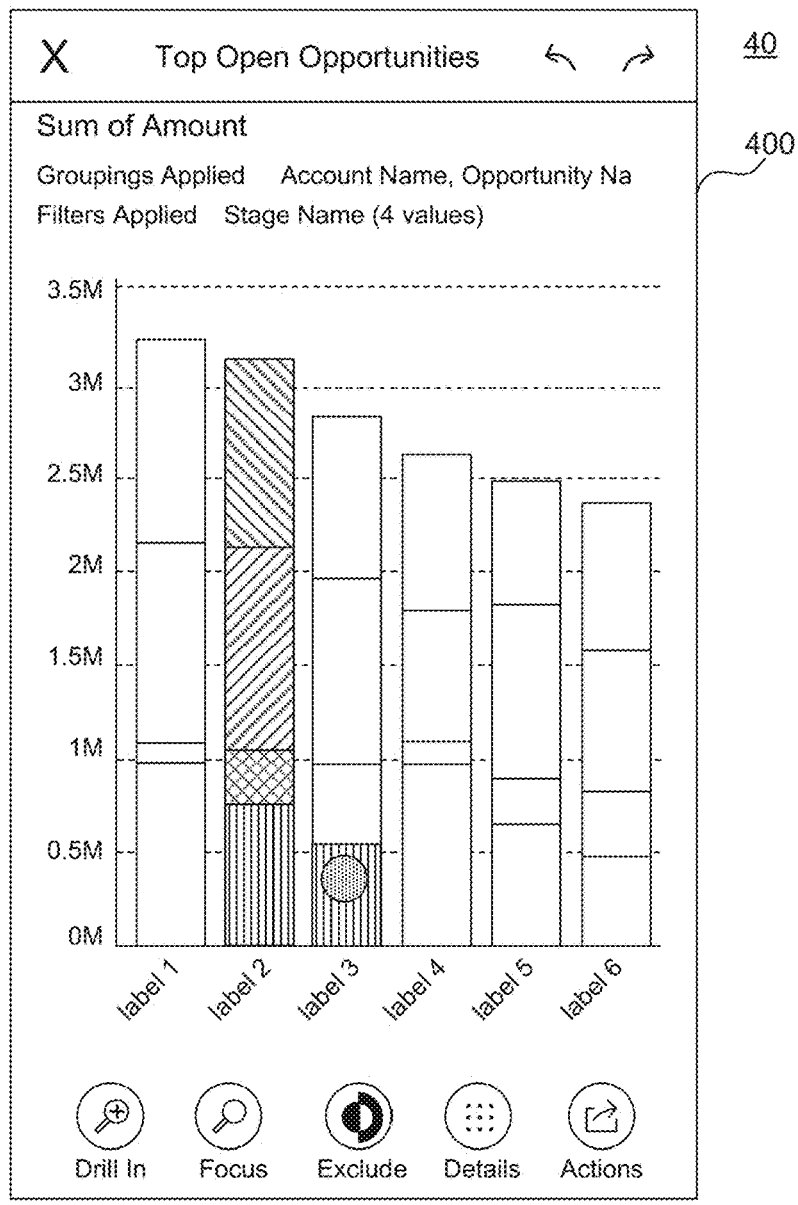
Figure 4F:
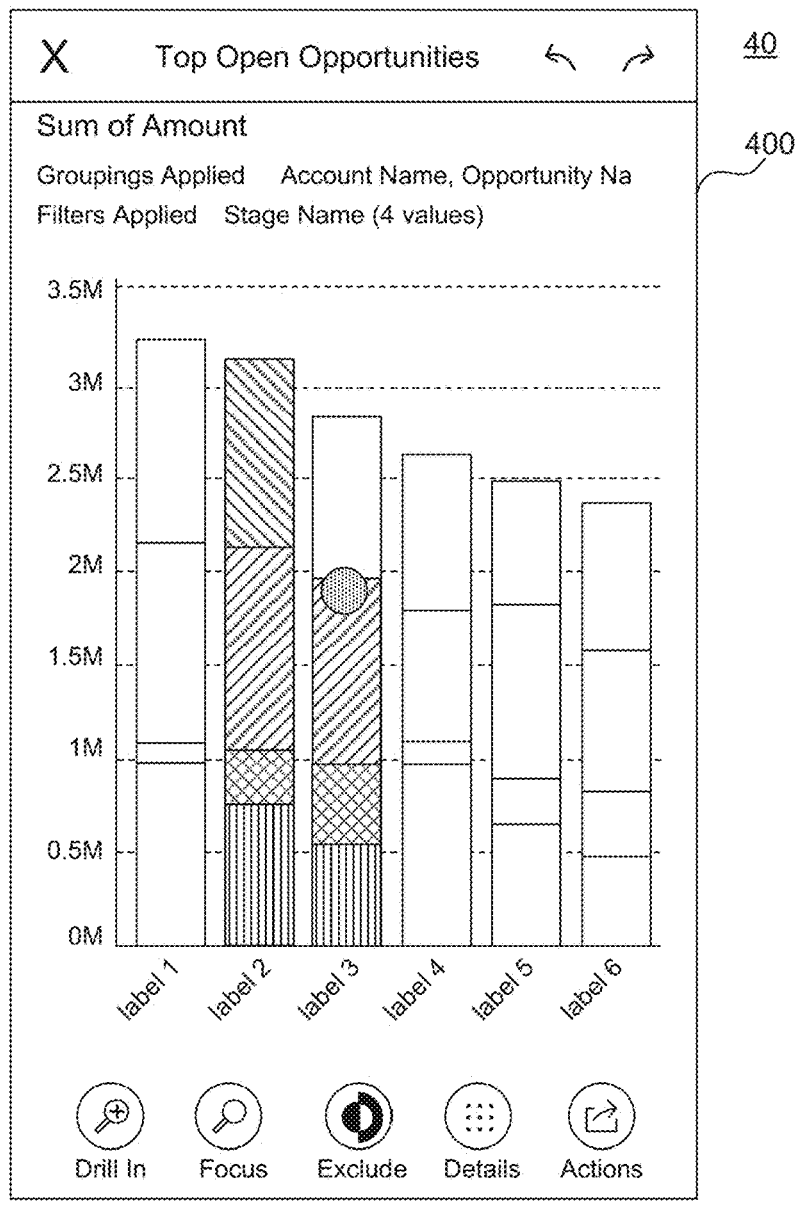
Figure 4G:
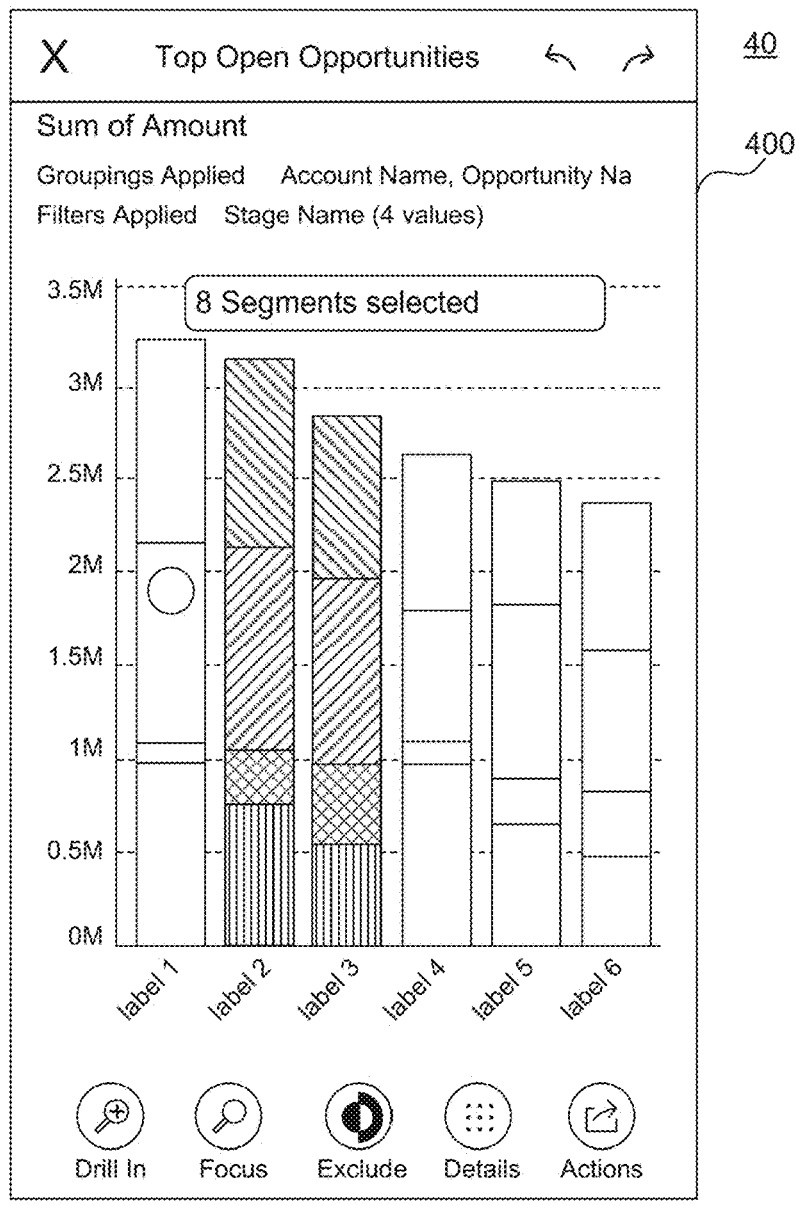
Figure 4H:
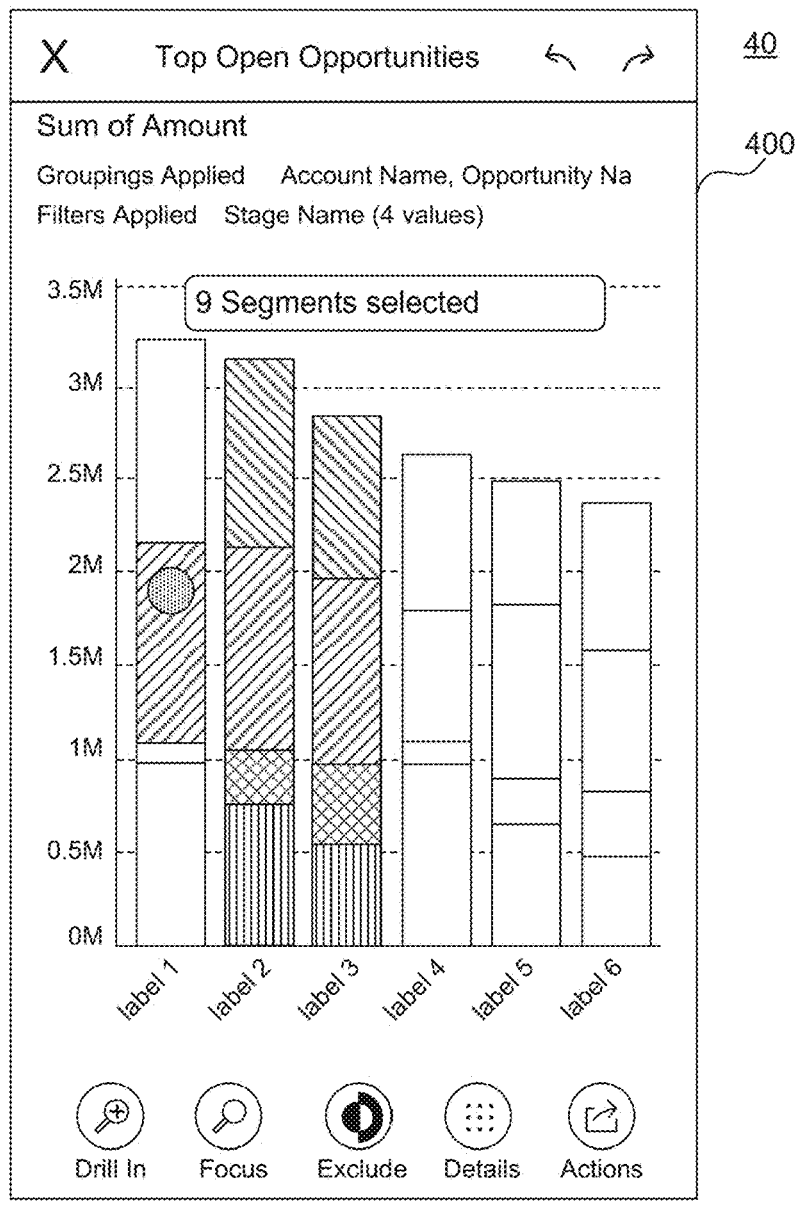
Figure 4I:
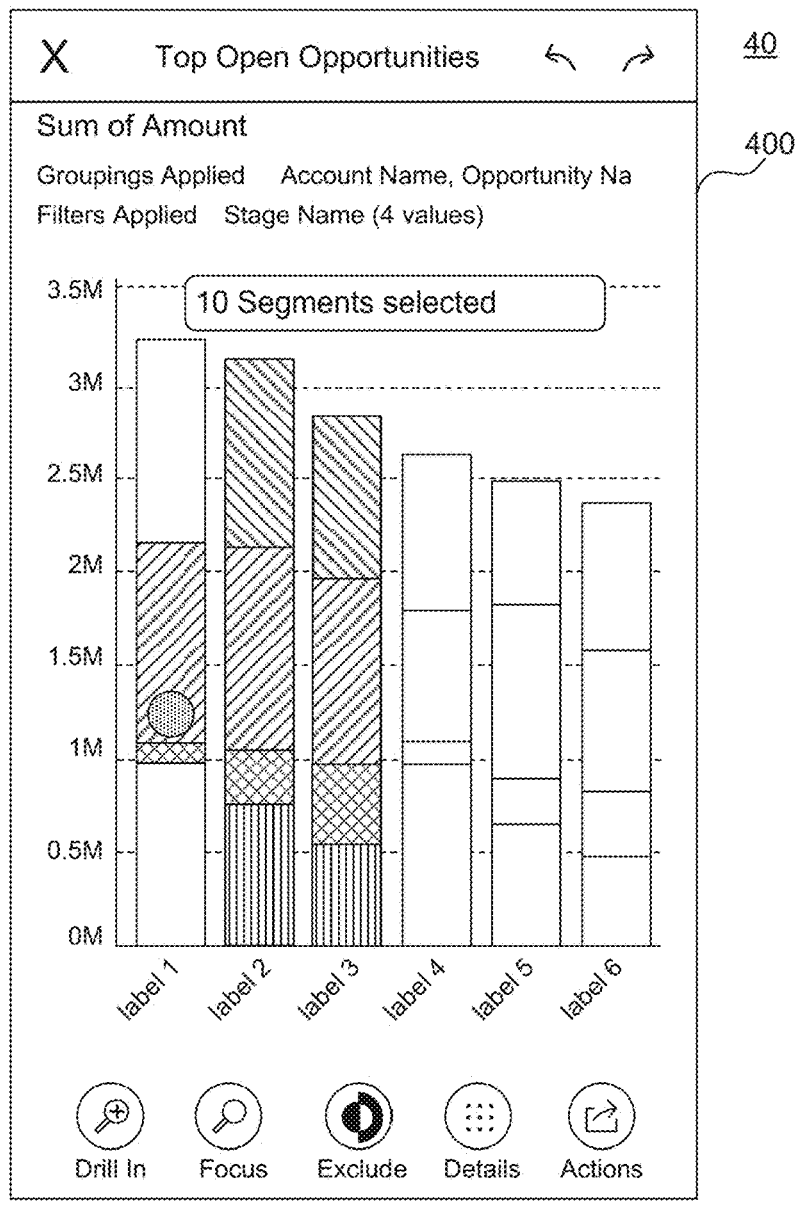
Figure 4J:
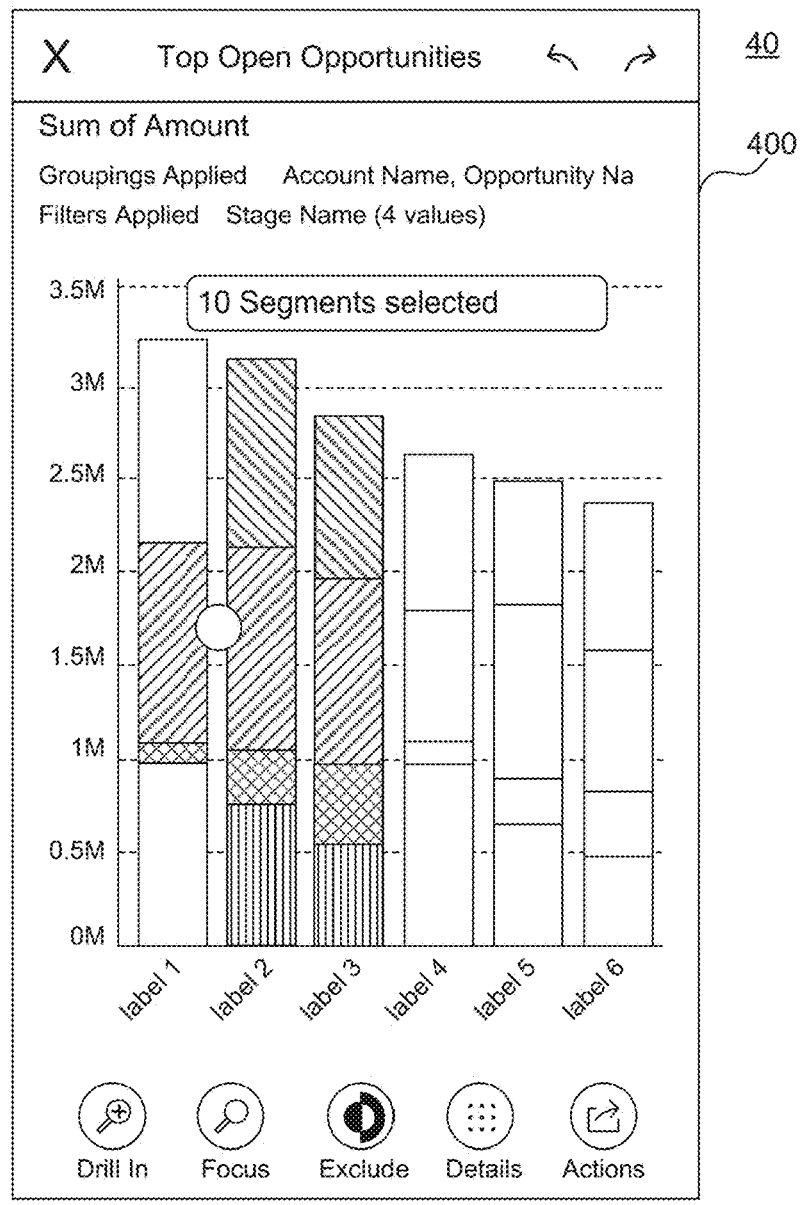
Figure 4K:
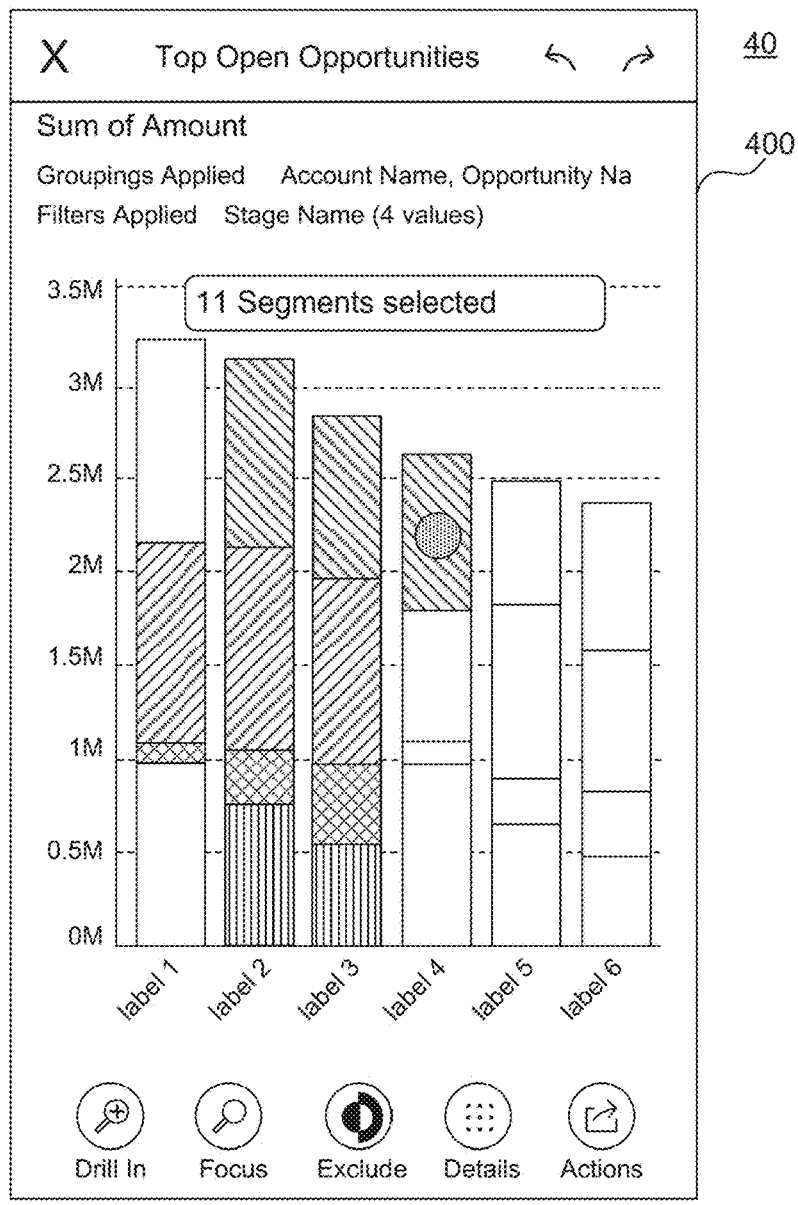
Figure 4L:
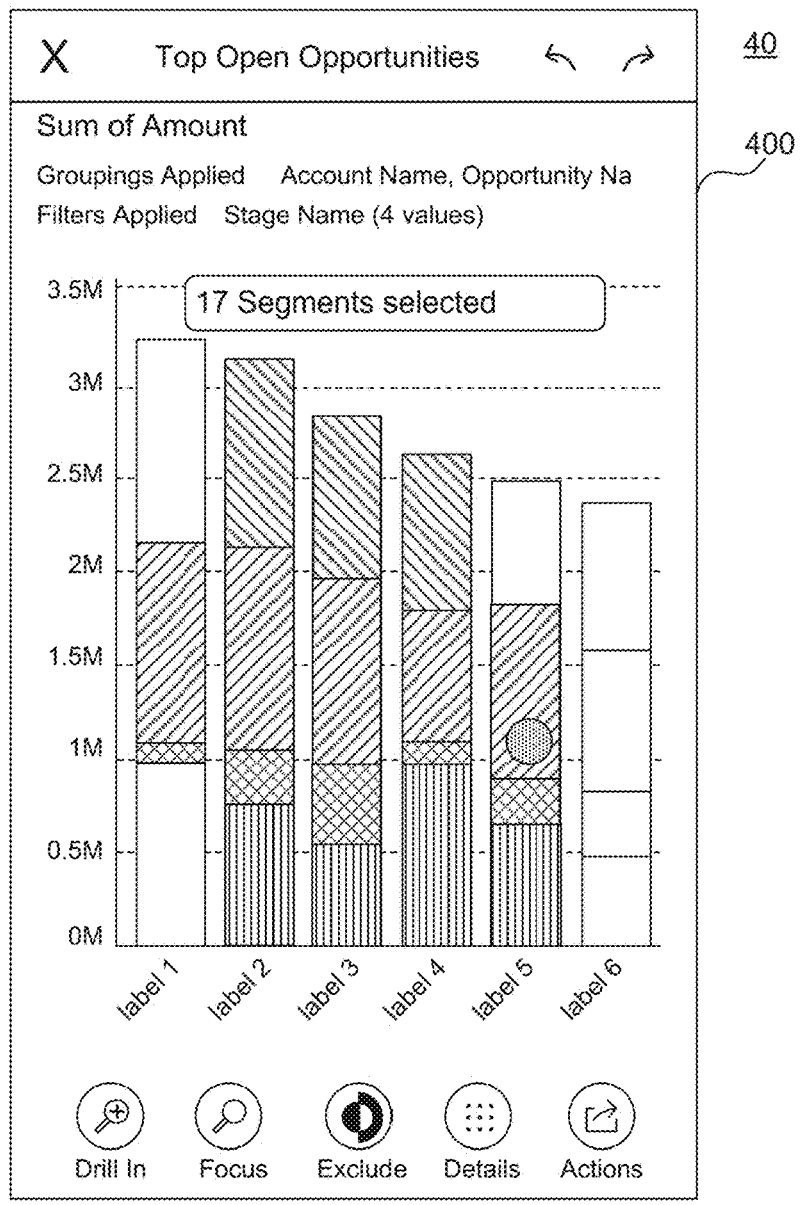
Figure 4M:
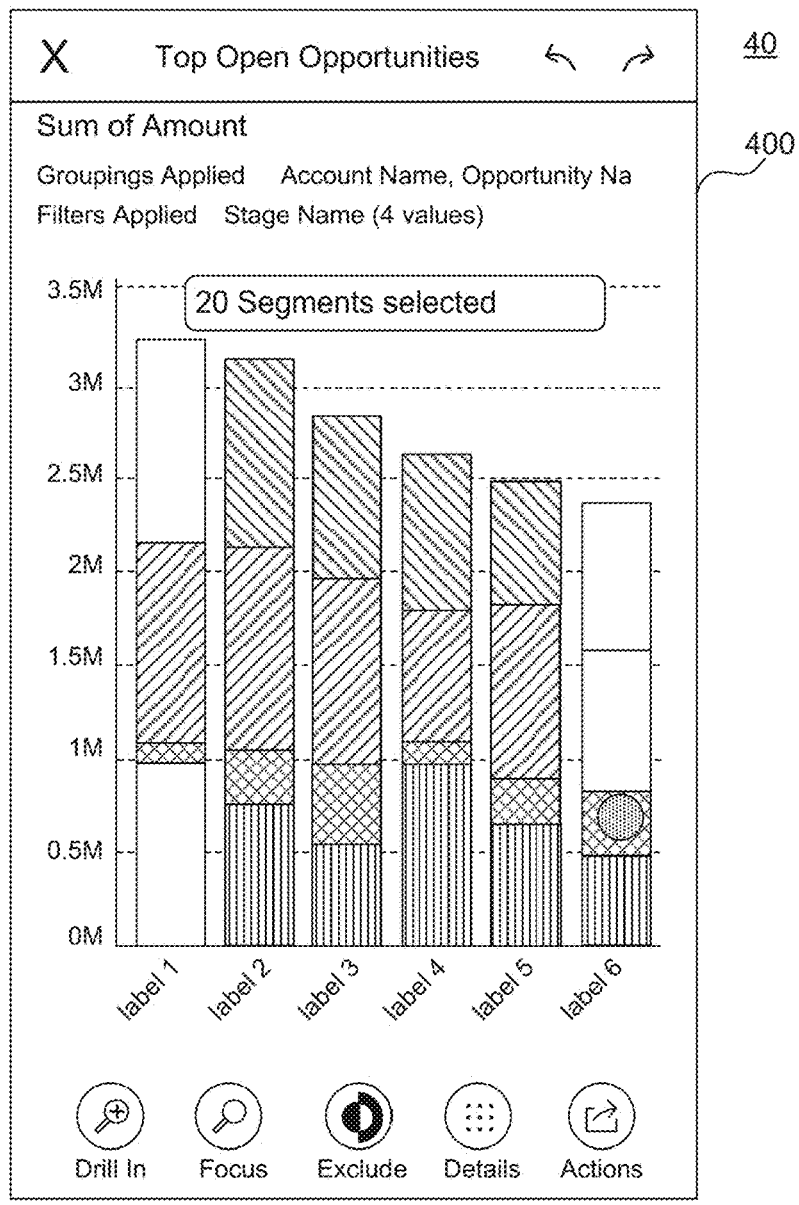
Figure 4N:
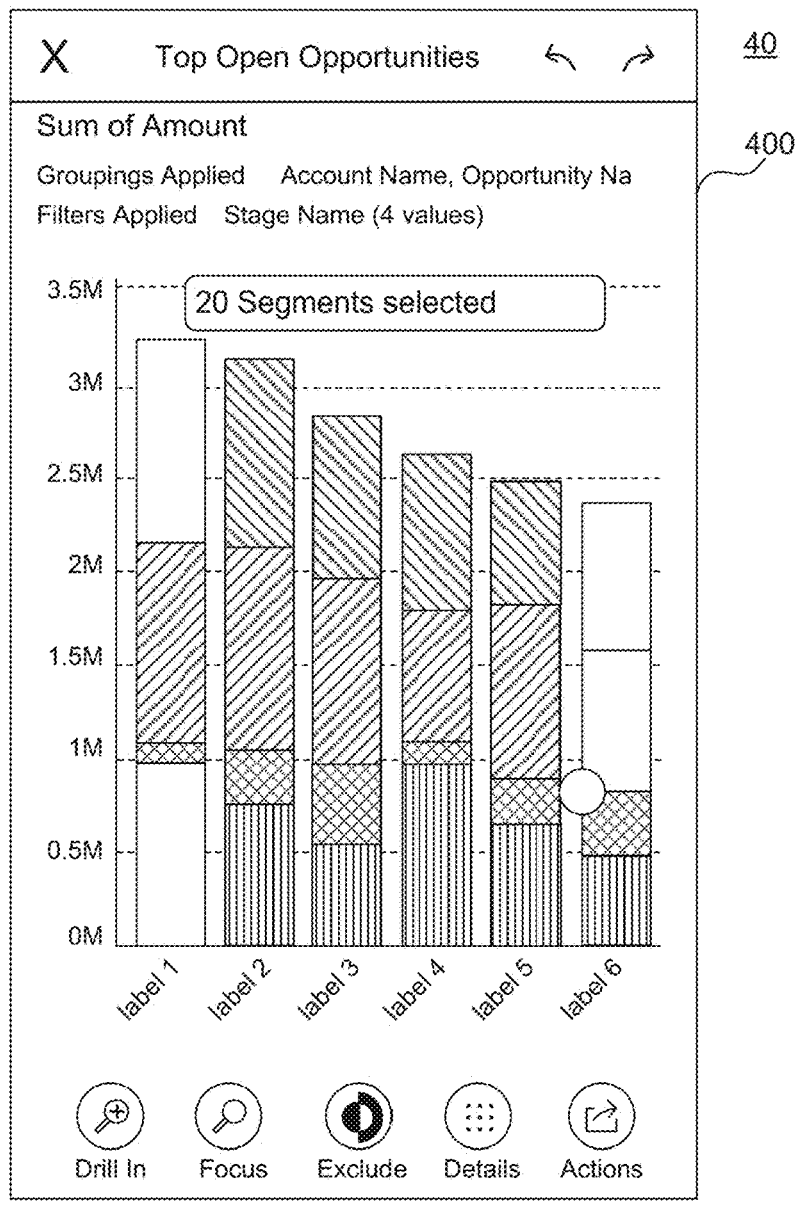
Figure 4O:
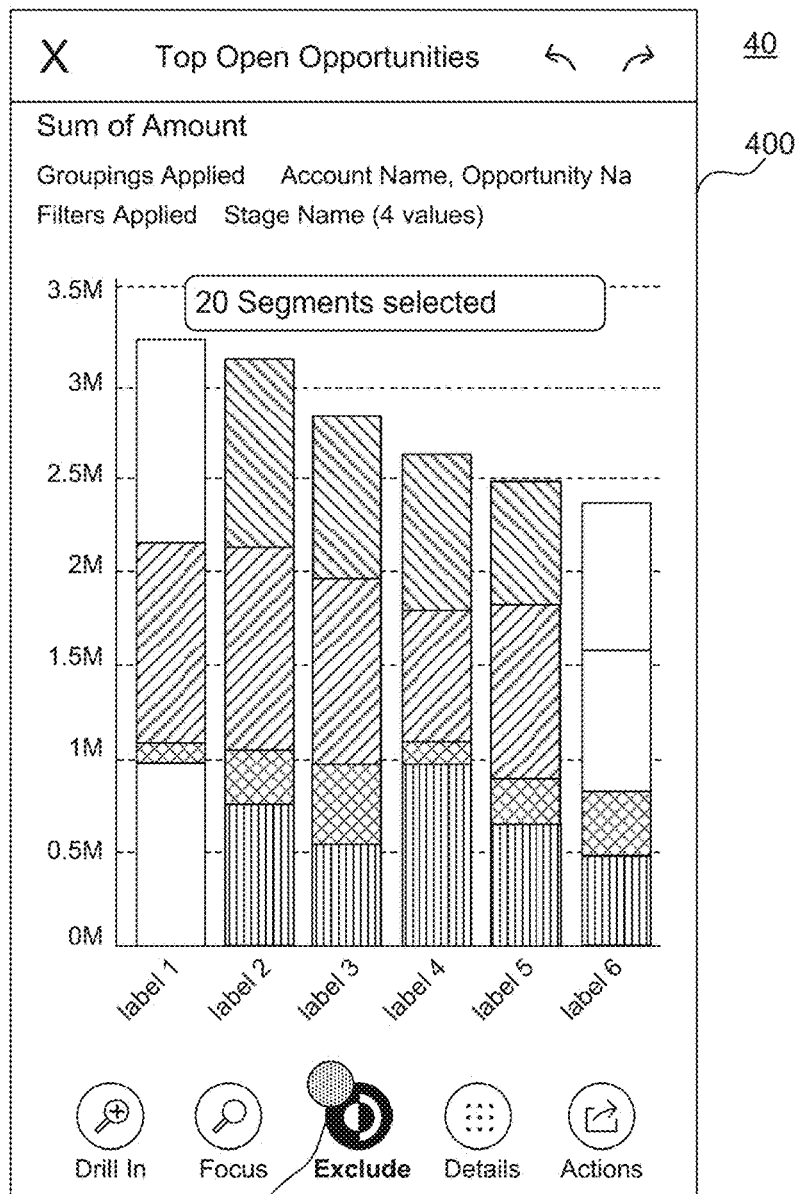
Figure 4P:
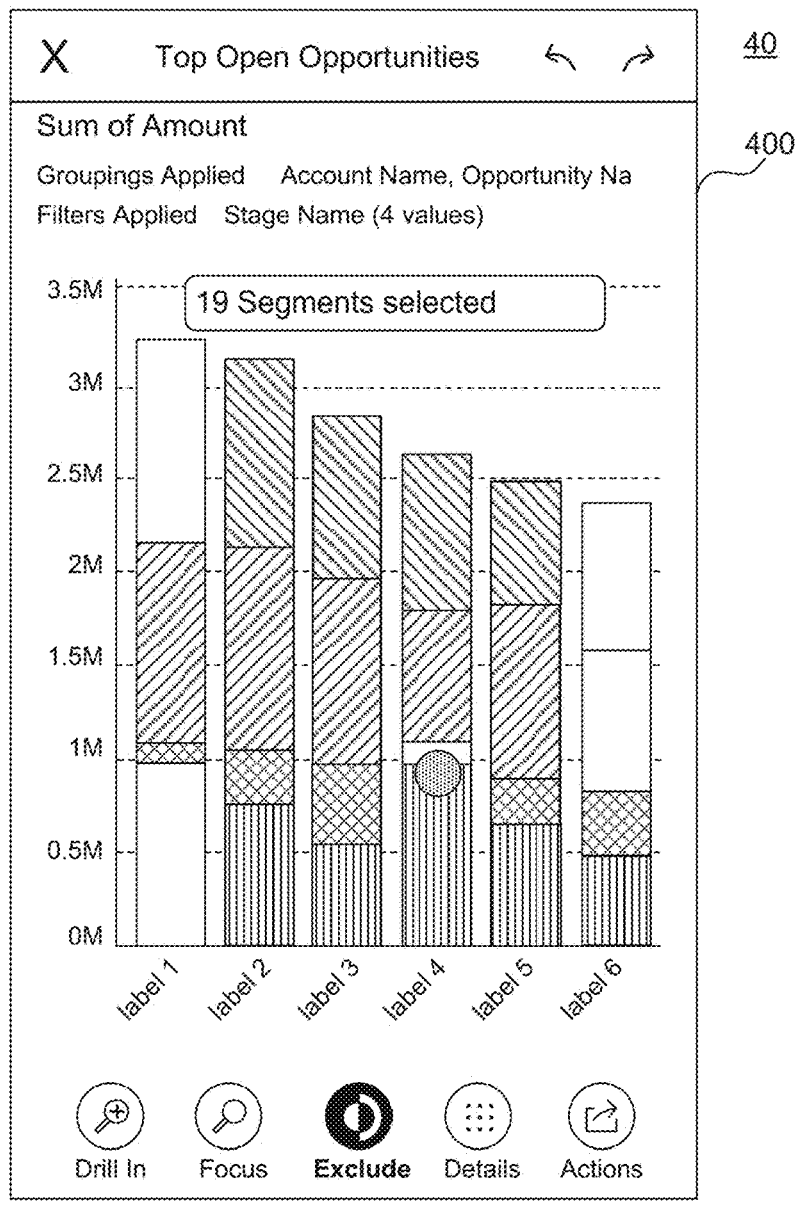
Figure 4Q:
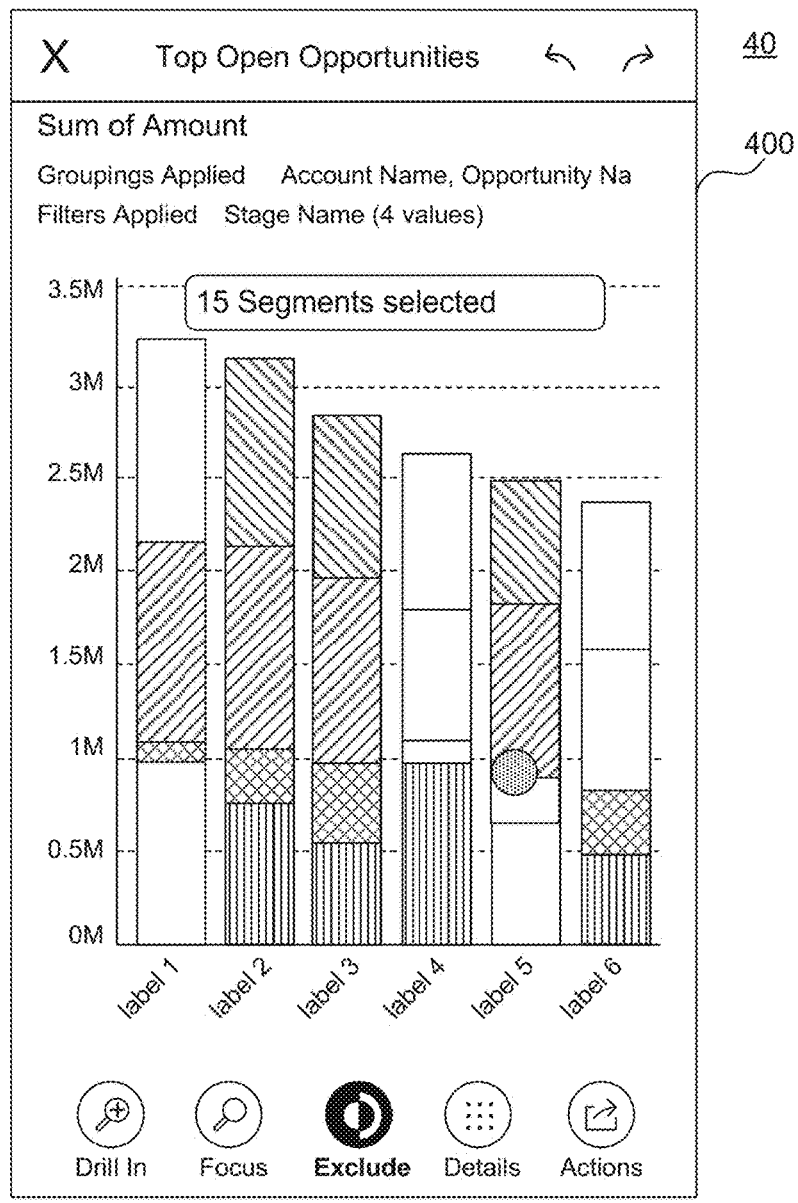
Figure 4R:
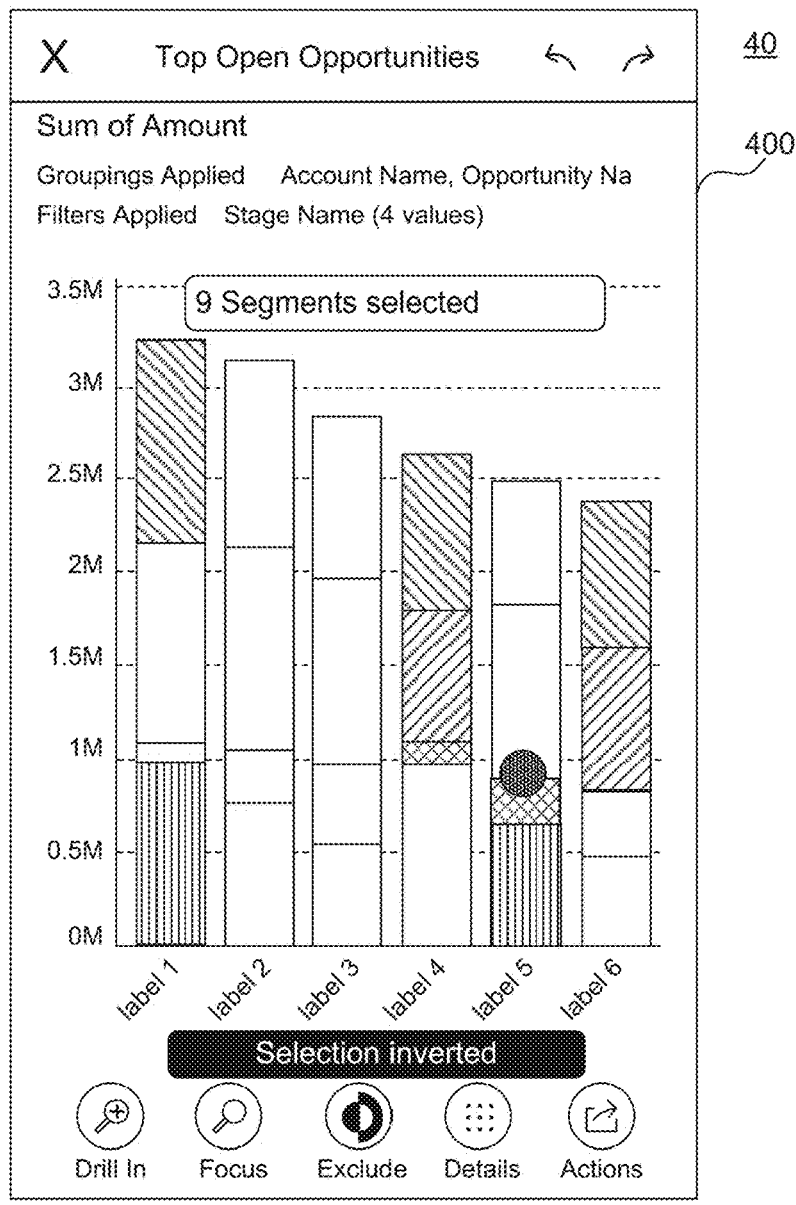
Figure 4S:
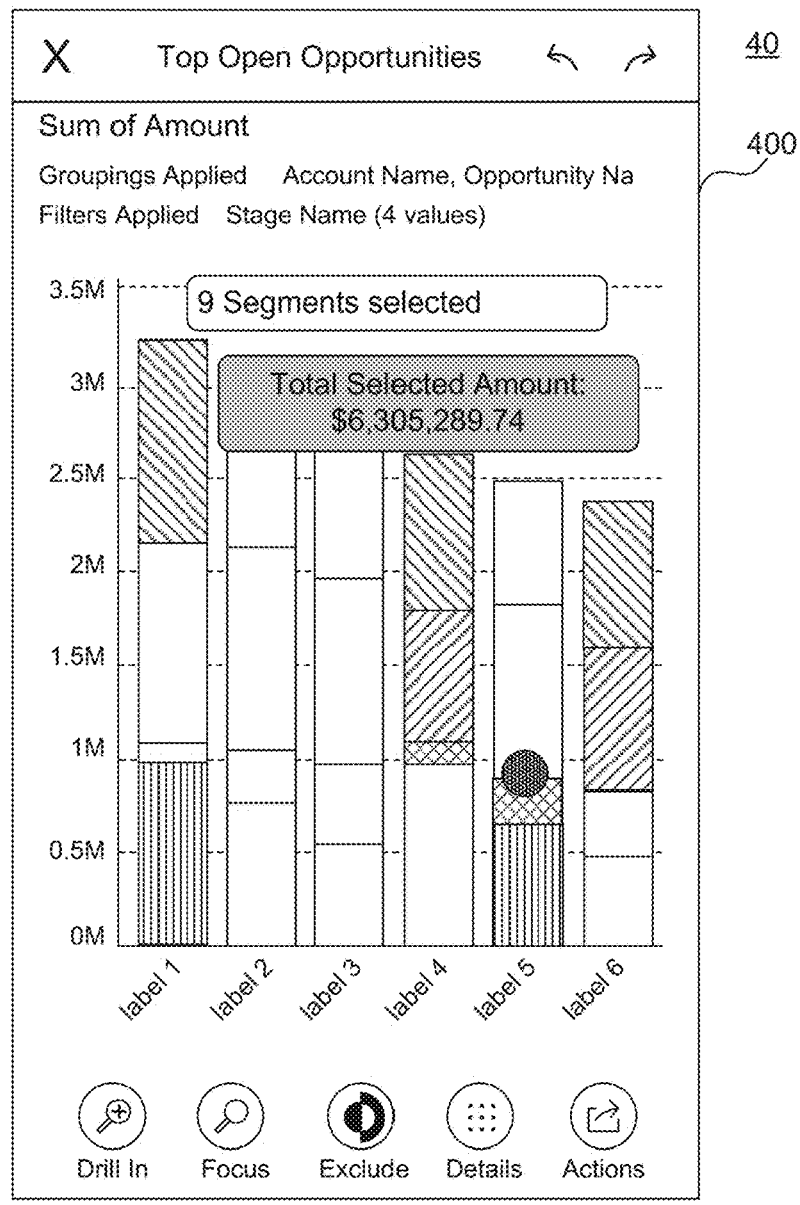

FIGS. 4A-4S demonstrate an animated action of selecting multiple elements on a stacked bar chart, according to an exemplary embodiment. An example of a drawing multi-selection in a bar chart can be seen in FIGS. 4A-4S as a progression of select frames of GUI display 300, represented in FIGS. 4A-4S as GUI display 400.

FIG. 4A shows computer system 40 with GUI display 400, configured to allow selection of multiple elements, such as any set or subset of bars 402-412 or segments 402a-d through 412a-d as currently displayed or graphed on GUI display 400, such as via a multi-selection operation. The configuration of GUI display 400 to allow selection of multiple elements may, in some embodiments, be enabled by default and always on. In other embodiments, modal and/or contextual operation may be provided, utilizing modes, sub-modes, and/or contexts, as described above, which may further be indicated by other indicia on GUI display 400 of a present operating mode or context, for example.

Compared to FIG. 3, FIG. 4A as depicted differs in showing a representation of a cursor or pointer 401. In this embodiment, cursor or pointer 401 may be to indicate a position of a mouse, touch pad, joystick, motion controller, motion sensor, position sensor, light sensor, or similar pointing device. In other embodiments, which may employ touch screens for use with a finger or stylus, for example, cursor or pointer 401 may not always be visibly displayed. However, for purposes of illustration in FIGS. 4A-4S, cursor or pointer 401 will always be displayed, with a blank background indicating no other button being engaged.

Additionally, for illustrative purposes in FIGS. 4A-4S, cursor or pointer 401 may be shaded to indicate that a selection button or similar corresponding selection signal associated with the pointing device is engaged or depressed. A light shading may indicate a primary button being engaged. A dark shading, such as in FIG. 4S, may indicate a secondary button or signal being engaged. In some embodiments, cursor or pointer 401 may actually change its color, shading, brightness, size, etc., to denote engagement of buttons or other signals associated with the cursor or pointer 401, such as for selection. This may be treated as a feature for accessibility, in particular embodiments.

FIG. 4A shows all bars or segments as unselected and being substantially the same color. In embodiments with contexts or mode switching, this state may be achieved, in some embodiments, by switching to a multi-selection mode or context, such as by pressing, tapping, clicking, or otherwise engaging a draw selection button, or, in a mode or context allowing drawing multi-selection, by beginning to draw a drawing a virtual multi-selection line (not shown) with cursor or pointer 401, such as using a pointing device for input. In some exemplary embodiments, unselected bars or segments may be displayed as a shade of gray, or in grayscale equivalents of their original colors.

For FIGS. 4A-4S, the bottom portion may contain icons, virtual buttons, or other virtual knobs or handles for additional actions to be performed with the chart, elements, or data displayed; for example, saving changes, opening additional menus, or switching selection modes, such as between selection and de-selection, or switching view modes, such as for panning or zooming. Additional actions may also be possible, such as for computer system 40, including sharing links or snapshots.

In this illustrative embodiment of FIGS. 4A-4S, drawing multi-selection may be always enabled, such as without mode switching or special contextual operations. In other embodiments, there may be a draw selection button, which may be used to toggle a mode or sub-mode for the drawing multi-selection operation. Such a draw selection button may, in some embodiments, be located in a fixed position on GUI display 400, irrespective of any additional consoles or other buttons, in a non-limiting exemplary embodiment. For other embodiments that may lack fixed buttons at the bottom of GUI display 400, there may be an additional console such as that of additional console 216 in FIGS. 2A-2N.

FIGS. 4B-4N show a drawing multi-selection operation, at selected frames of an animated display output of GUI display 400. In FIG. 4B, cursor or pointer 401 is in the same position where it was in FIG. 4A, but it is now shaded as an indication of a primary selection button or signal being depressed or engaged. As a further result, which may occur at substantially the same time as when the primary selection button or signal becomes depressed or engaged, segment 404d becomes highlighted. This is because the engaged cursor or pointer 401 coincides in position on GUI display 400 with segment 404d.

At this point, only one segment is highlighted and selected. In this exemplary embodiment, a popup balloon may appear, indicating "1 Segment selected" near the upper right portion of the bar chart. In other embodiments, this indication may appear in any other part of GUI display 400, on a separate external display, or by other output means, such as output being programmatically passed to another program or function separate from the GUI. In still other embodiments, the indication may appear in a dialog box or in a fixed or dedicated portion of GUI display 400 or another display. Popup balloons indicating value(s) of selected element(s) or of the selection set may also be seen and described with respect to FIG. 4S below.

FIGS. 4B-4D show the engaged cursor or pointer 401 being dragged down to adjacent segment 404c in the same bar 404. FIG. 4C depicts an intermediate animation. In FIG. 4D, the engaged cursor or pointer 401 has a position coinciding with that of segment 404c, and now segment 404c becomes highlighted at substantially the same time as when cursor or pointer 401 aligns with segment 404c's position.

In a similar fashion, FIG. 4E depicts a motion in which the cursor or pointer 401 continues to be dragged down over segments 404b and 404a, each becoming highlighted along the way. Cursor or pointer 401 is then dragged over to the next bar 406, on segment 406a.

Also, in this embodiment as shown in FIG. 4E, each segment 404a-d of bar 404 is highlighted, with each highlighted segment being a different color or pattern, different not only from the unselected bars or segments, but also from each other highlighted segment within the same bar. In some embodiments, these differences among selected segments within the same bar may be entirely different colors, or they may be different hues, saturation values, shades, or brightness levels of the same color, as a non-limiting example. In other embodiments, if a whole bar is selected (i.e., if all segments in a bar are selected), the bar as a whole may be displayed differently, such as with a single color across all segments that would otherwise be varied if only some but not all segments were selected.

In this embodiment, all of the displayed bars may be displayed using the same color when selected, apart from the variations among segments in the same bar. Alternatively, each bar may have a unique color, but segments at each level of stacking may have varied hues, saturation values, shades, or brightness values in similar patterns across differently colored bars. However, in some embodiments, corresponding segments at the same level of stacking, such as 404a and 406a, may have the same type of highlight when selected. Additionally, unselected bars or segments may be uniformly blank, as shown for example in FIGS. 4A-4S, or the unselected bars may be shown in grayscale, with each unselected segment having the same grayscale value for corresponding levels of stacking.

FIGS. 4F-4N show additional intermediate stages of drawing multi-selection as cursor or pointer 401 is dragged across the stacked bar chart on GUI display 400. In some embodiments, elements will be selected in real time during the period in which the virtual multi-selection line is being drawn across GUI display 400 following cursor or pointer 401, as described above. In some embodiments, in a regular viewing mode, for example, all the bars and segments may each have some particular color fill, and be blanked or grayscaled when entering a selection or multi-selection mode or context. Then, in a selection or multi-selection mode or context, as bars or segments are selected, they may be restored from their unselected color(s) to their original color(s) as soon as they are selected.

Advancing from FIG. 4E to FIG. 4H, it can be seen that the cursor proceeds up bar 406, through segment 406c in FIG. 4F, highlighting and selecting intervening segment 406b along the way, and also ultimately selecting segment 406d in FIG. 4G, thus highlighting and selecting all segments 404a-d and 406a-d, for all of bars 404-406. Cursor or pointer 401 is then disengaged, such as by releasing or deactivating a primary selection button or signal, and then cursor or pointer 401 is moved over to the left to be positioned on segment 402c.

Because the selection button or signal is not engaged after having selected segment 406d (bar 406) in FIG. 4G, no additional selections are made when cursor or pointer 401 is moved across to be positioned on segment 402c. If the selection button or signal had still been engaged, this movement could have resulted in the selection of segments 402c-d, or alternatively segments 402a-c, depending on configuration settings for multi-selection on a stacked bar chart. In this embodiment, as will be shown purely by way of example in FIGS. 4K-4M that follow, the default configuration would be to treat the stacked bars as if they were in a sequence of 402d being logically adjacent to 404a, such that if the selection button or signal had still been engaged, this movement could have resulted in the selection of segments 402c-d, also encompassing 406a-c and 404a-d on the way to 402c from 406d. Other embodiments may treat multi-selection on a bar chart as always moving from the bottom up when traversing bars horizontally. In still other alternative embodiments, segments on a stacked bar chart may be treated discretely, similarly to bubbles on a bubble chart as described with respect to FIGS. 1-2N above.

FIG. 4H shows that the primary selection button or signal is again depressed or engaged, resuming the multi-selection action and discretely adding segment 402c to the selected set of elements, not including any intervening elements. Depending on configuration settings, such an action of resuming a multi-selection action may be treated as if it were never interrupted, and thus selecting intervening elements in any of the ways described in the immediately preceding paragraph. This feature may be implemented for accessibility purposes, for example.

FIG. 4I shows a continued multi-selection operation, in which the engaged cursor or pointer 401 is moved or dragged downward within the already selected segment 402c, close to but not overlapping the displayed portion of segment 402b. Nonetheless, segment 402b becomes highlighted and selected as if it had been directly coinciding with the position of the engaged cursor or pointer 401. This depiction is a demonstration of selection of an element by its virtual size. In this case, because segment 402b is relatively small and likely difficult to select precisely with many typical displays and input devices, it may be possible, in some embodiments, to select or de-select such relatively small elements without directly placing an engaged cursor or pointer 401 on each one as displayed, but rather only triggering such selection or de-selection events by a relatively small element's virtual size, as if segment 402b were actually extending up and down by a significant margin or tolerance for purposes of selection.

Referring now to FIGS. 4J-4M, FIGS. 4J and 4K show a once again a disengagement of cursor or pointer 401 in FIG. 4J as in FIG. 4G, and moving the cursor toward segment 408d, and re-engaging once again in FIG. 4K as in FIG. 4H. Advancing to FIG. 4L, it is possible to achieve this selection in at least two different ways. For example, in a rigid implementation, this selection may be achieved by dragging the engaged cursor all the way down bar 408 and then right to segment 410a, then up across segment 410b to segment 410c. However, in a work-saving shortcut, this selection may be achieved simply by dragging the engaged cursor diagonally down and right, straight from segment 408d to segment 410c, with the GUI automatically selecting the intervening elements in sequence, as described three paragraphs above. This process may again be repeated (or continued in a single continuous motion of cursor or pointer 401) to segment 412b, as shown in FIG. 4M, selecting all of bar 410, including intervening segment 410d, and intervening segment 412a of bar 412, along with the directly selected segment 412b.

Referring to FIGS. 4N-4Q, FIG. 4N shows cursor or pointer 401 once again being disengaged, and then moved. FIG. 4O shows that the pointer is moved all the way down to one of the icons of a virtual button below the stacked bar chart. In this embodiment, icon 418 and virtual button are labeled "Exclude" below, representing a switch to, and indication of, a de-selection mode or sub-mode when pressed. Here, a virtual button is pressed when the cursor or pointer 401 is placed substantially over its corresponding icon and then depressing or engaging the primary selection button or signal, as done with selecting graphed elements on the stacked bar chart, for example, in a selection mode or sub-mode or by default, in some exemplary embodiments. Additionally, the icon may present some indication that its corresponding virtual button has been pressed or engaged, and that the current mode, sub-mode, or context, corresponds to that selected upon pressing or engaging the virtual button. In this particular embodiment shown, the button indicates selection by inverting the colors of icon 418. In other embodiments, icon 418 may be changed to a different color, such as a standard icon-selection color. In yet other embodiments, icon 418 may remain with the same appearance, but the other icons shown may be grayscaled, grayed out, faded, otherwise altered, or removed.

Once in a de-selection mode, sub-mode, or context, the cursor or pointer 401 may be again disengaged (not shown) and moved back to the chart to perform de-selection action(s). Advancing to FIG. 4P, the disengaged cursor or pointer 401 is moved up to around the top of segment 408a, near segment 408b, and then engaged, as shown in FIG. 4P.

Upon engaging cursor or pointer 401 in the de-selection mode, sub-mode, or context, a selected element under the cursor will become deselected, removing the corresponding data or query element from the selected set, and returning the graphical element to its unselected state, which is non-highlighted, in this embodiment. Here, although cursor or pointer 401 has its center of mass over segment 408a, cursor or pointer 401 is positioned within the virtual size of segment 408b when it is engaged. The action, although de-selection rather than selection, is performed similarly to that described with respect to FIG. 4I described above, regarding virtual size selection.

Advancing to FIG. 4Q, engaged cursor or pointer 401 is simply dragged a relatively short distance right of its position in FIG. 4P, over to segment 410b. As with the shortcut multi-selection operation described four paragraphs above, de-selection works the same way, encompassing the sequence of intervening elements between the directly indicated elements 408b and 410b, thus further de-selecting and un-highlighting elements 408b-d and elements 410a-b. Similarly, again, although the center of mass of cursor or pointer 401 is technically positioned on segment 410c, cursor or pointer 401 is still within the virtual size of segment 410b. Because of the relatively large size of segment 410c, in this embodiment, 410c does not have a virtual size larger than its actual displayed size (physical size), but because 410b is relatively small on GUI display 400, it may have a virtual size extending up and down over segments 410a and 410c. In some embodiments, this virtual size may be the same for all elements having a virtual size larger than a corresponding displayed size (physical size). In other embodiments, the virtual size may scale according to various algorithms or formulas.

In FIG. 4R, without significantly moving cursor or pointer 401, a secondary button or signal becomes depressed or engaged. In this embodiment, such a depression or engagement of the secondary button is indicated by a darker highlight of cursor or pointer 401. In other embodiments, there may be no other indicia present corresponding to the secondary button or signal. As shown in FIG. 4R, in this embodiment, the depression or engagement of the secondary button or signal is configured to reverse the selection status of currently selected elements.

As a result, currently selected elements may become deselected, with their corresponding graphical elements reverting to their unselected states and with corresponding data and queries being removed from the selection set; and all unselected elements in the chart, either as displayed or in total, will become selected. As also shown near the bottom, in this embodiment, of GUI display 400 in FIG. 4R, a (popup) balloon, dialog box, or other indicator may appear, denoting that the current selection has been inverted. In other embodiments, this indicator may appear in any other part of GUI display 400.

This selection inversion feature may provide advantages further simplifying the multi-selection process and saving effort on the part of users. For example, with a multi-selection in which a user desires to select most elements displayed on a chart, it is possible just to select first all elements not desired, and then simply invert or reverse the selection. In some cases, this may save more work over selecting all and deselecting unwanted elements. Selection inversion in this way may also act as a "select all" feature from a default state in which no elements are initially selected.

Additionally, while the depicted embodiment may rely on a secondary button or signal, such as from the pointer or similar input device, to effect the inversion of current selection, it is also possible to achieve the same effect via another virtual button on GUI display 400, located elsewhere on computer system 40, or via other peripheral input devices or other channels, such as programmatic interaction via an API.

Although FIG. 4R only depicts a stacked bar chart, such selection inversion may be implemented in similar fashion with a standard bar chart, or with a bubble chart, or with any other such selection of a subset from a larger set of elements in a graph, chart, or otherwise displayed set of graphical representations of underlying data.

FIG. 4S depicts an indication of underlying data pertaining to the selected set of elements. In this non-limiting example, the indication is a numerical value representing a sum total of a certain value pertaining to each selected segment, across all selected segments. For example, where each segment may represent a currency amount, such as with account balances or sales data, there may be a balloon, dialog box, or other indicator appearing, indicating the total value of all selected elements for a currency field. In other embodiments, the result(s) may be displayed anywhere on GUI display 200, including in a dialog, a window, a dedicated section of the display, on a separate external display, or by other output means, such as output being programmatically passed to another program or function separate from the GUI.

In some embodiments, this field may be common to each element, each element having a set value. In other embodiments, the value of the field may not be specifically set, and may have a defined default value. The values may be retrieved, in some embodiments, by the database query generated in response to one of the multi-selection operations described above.

Once the values have been retrieved, additional processing may be performed, such as arithmetic operations, statistical operations, other mathematical transforms, or display formatting, to name a few non-limiting examples. In the exemplary embodiment of FIG. 4S, a summation of the values may be performed. In the non-limiting examples of FIGS. 2M and 2N described above, additional operations of varying complexity may also be performed. Similar processing may be performed here. Results of the processing may be displayed and updated in substantially real time as multiple elements are being selected (or de-selected) in a selection or multi-selection mode, sub-mode or context. Alternatively, such processing and display of results may be performed upon a switch of mode, sub-mode, or other context, without updating in real time as the number of selected elements changes.

Figure 5:
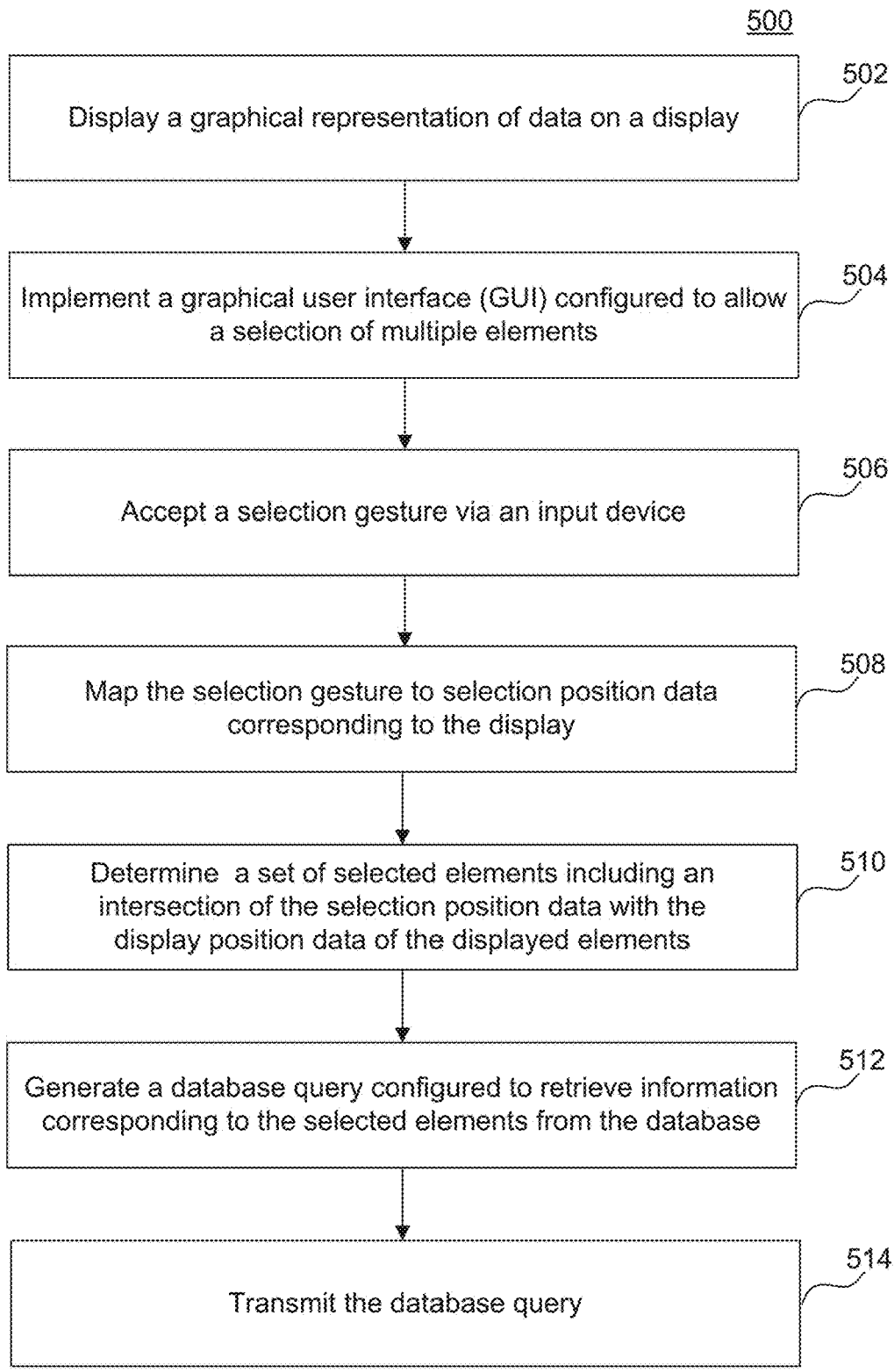
FIG. 5 shows a flowchart illustrating a process for selecting multiple elements on a chart, according to an embodiment.

FIG. 5 shows a flowchart illustrating a process 500 for selecting multiple elements on a chart, according to another embodiment. Process 500 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order from that shown in FIG. 5, as will be understood by a person of ordinary skill in the art.

Process 500 shall be described with reference to FIG. 5. However, process 500 is not limited to that example embodiment.

In 502, processor(s) with memory may be configured to display a graphical representation of data on a display, such as GUI display 100 in FIG. 1, or GUI display 300 in FIG. 3, to name a few non-limiting examples. Virtually any type of display device may be used in connection with the processor and memory. Exemplary computer systems having processor(s), memory, and display device(s) may be further described in FIG. 6 and accompanying descriptions below.

In 504, a GUI may be configured to allow a selection of multiple elements. For example, such a multi-selection may be described in any of the examples provided above in conjunction with FIGS. 2A-2N and FIGS. 4A-4S, to name a few non-limiting examples. Such configurations, for example, may be enabled in hardware and software, in some exemplary embodiments.

In 506, the processor(s) and memory, and the GUI, by extension, may be further configured to accept a selection gesture via an input device. The input device may be virtually any type of input device that would allow positioning on a display device and logical display such as GUI display 100 of FIG. 1 or GUI display 300 of FIG. 3, for example. Non-limiting examples of input devices are provided throughout this specification. Some examples include a mouse, touchpad, touch screen, joystick, motion controller, motion sensor, position sensor, or light sensor, to name a few.

The selection gesture may be accepted as a single continuous motion. Alternatively, the selection gesture may be broken into multiple sequences or operations, delimited by switches of modes, sub-modes, and/or contexts enabling selection within the GUI. The selection gesture may be facilitated by any of various interpolation techniques, such as those using lines or splines, further described in several places throughout this specification.

In 508, the selection gesture accepted in 506 may be mapped by processor(s) with memory to selection position data corresponding to the display, such as a physical and/or logical position in GUI display 100 of FIG. 1 or GUI display 300 of FIG. 3, for example. Such a mapping may be further useful in determining from the displayed set of elements a subset of elements which forms a selection set, as in 510. This determination may be performed in a variety of known ways, and may also include spline or linear interpolation to complete selection areas and clearly demarcate selected areas of a GUI display from non-selected areas. This mapping may also account for virtual size of relatively small graphical elements or objects displayed on GUI display 100 of FIG. 1 or GUI display 300 of FIG. 3, for example.

In 510, the mapping of 508 may be used by processor(s) and memory to determine the selection set, from the set of elements displayed in GUI display 100 of FIG. 1 or GUI display 300 of FIG. 3, to name a few non-limiting examples. More specifically, this set of selected elements may include an intersection of the selection position data with the display position data of displayed elements, for example. Other techniques may be used to determine elements inside or outside an area designated for selection of multiple elements therein.

In 512, based on the selection set determined in 510, processor(s) and memory may be used to generate a database query configured to retrieve information corresponding to the selected elements, from the database. In some embodiments, the information queried for retrieval may be all associated data corresponding to each selected element. In other embodiments, the database query may be composed so as only to retrieve certain desired information corresponding to each selected element. This may be done because the underlying data corresponding to each element may be an extensive data structure for each element, containing too much information to be practically handled by a computer system displaying GUI display 100 or 300, for example. Instead, the database query may efficiently request only the data needed to be displayed and/or processed, such as for a requesting user.

In 514, the database query may optionally be transmitted to a database, in order to retrieve the information corresponding to the selected elements from the database. Once that corresponding information has been received in response to the query, then additional processing may be performed (not shown). Such additional processing may lead to results such as those displayed in FIGS. 2M, 2N, and 4S, to name a few non-limiting examples.

Additionally, configuration information and changes thereto may be generated by users, machines, or programs, using any number of interfaces such as APIs, protocols, or user tools, including text editors, web-based configuration front-ends, graphical configurators, voice input, environment sensors, etc.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

The data, files, and/or databases may be stored, retrieved, accessed, and/or transmitted in human-readable formats such as numeric, textual, graphic, or multimedia formats, as well as various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML5 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any programming language, procedural, functional, or object-oriented, and may be compiled or interpreted. Non-limiting examples include C, C++, C #, Objective-C, Java, Swift, Go, Ruby, Perl, Python, JavaScript, WebAssembly, or virtually any other language, with any other libraries or schemas, in any kind of framework, runtime environment, virtual machine, interpreter, stack, engine, or similar mechanism, including but not limited to Node.js, VS, jQuery, Dojo, Dijit, OpenUI5, AngularJS, Express.js, Backbone.js, Ember.js, DHTMLX, React, Electron, among many other non-limiting examples.

Various embodiments may be implemented, for example, using one or more well-known computer systems, such as computer system 600 shown in FIG. 6. Computer system 600 may be used, for example, to implement process 500 of FIG. 5. For example, computer system 600 may display a graphical representation of data on a display, implement a GUI configured to allow a selection of multiple elements of the plurality of elements, by a selection gesture via an input device, map the selection gesture to selection position data corresponding to the display, determine a set of selected elements including an intersection of the selection position data with the display position data of the displayed elements, generate a database query, based on the set of selected elements, to retrieve information corresponding to the selected elements from the database, and transmit the database query, for example.

Computer system 600 includes one or more processors (also called central processing units, or CPUs), such as a processor 604. Processor 604 is connected to a bus or communication infrastructure 606.

Computer system 600 also includes user input/output device(s) 603, such as monitors, keyboards, pointing devices, etc., which communicate with communication infrastructure 606 through user input/output interface(s) 602.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes a primary or main memory 608, such as random access memory (RAM). Main memory 608 may include one or more levels of cache. Main memory 608 has stored therein control logic (i.e., computer software) and/or data.

Computer system 600 may also include one or more secondary storage devices or secondary memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a network interface or communication interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communications path 626.

A computer system may also be any one of a personal digital assistant (PDA), desktop workstation, laptop or notebook computer, netbook, tablet, smart phone, smart watch, or embedded system, to name a few non-limiting examples.

Any such computer system 600 may run any type of application associated with a layered repository facility, including legacy applications, new applications, etc.

Computer system 600 may be a client or server, accessing or hosting any applications through any delivery paradigm, including but not limited to remote or distributed cloud computing solutions; local or on-premises software ("on-premise" cloud-based solutions); "as a service" models, e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), or infrastructure as a service (IaaS); or a hybrid model including any combination of the foregoing examples or other comparable services or delivery paradigms.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use the configuration provider for layered repository using data processing devices, computer systems and/or computer architectures other than that shown in FIG. 6. In particular, embodiments may operate with software, hardware, and/or operating system implementations other than those described herein.

It is to be appreciated that the Detailed Description section, and not any other section, is intended to be used to interpret the claims. Other sections may set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method of accessing a database, the method comprising:

displaying, by at least one processor, a graphical representation of data on a display, wherein the graphical representation of the data comprises a plurality of elements, wherein the plurality of elements comprises displayed elements each having respective display position data corresponding to the display, wherein each element represents a respective data structure that corresponds to a respective entry in the database;

implementing, by the at least one processor, a graphical user interface (GUI) configured to allow a selection of multiple elements of the plurality of elements, by a first selection gesture and a second selection gesture via an input device, wherein a first mode is configured to accept the first selection gesture, wherein a second mode is configured to accept the second selection gesture, wherein the second mode is distinct from the first mode, and wherein the first selection gesture and the second selection gesture comprise a same type of operation via at least one of the GUI and the input device;

mapping, by the at least one processor, at least the first selection gesture to selection position data corresponding to the display, wherein the selection position data encompasses at least one invisible handle of a given element;

determining, by the at least one processor, a set of selected elements of the plurality of elements of the graphical representation of the data, wherein the set of selected elements comprises an intersection of the selection position data with the display position data of the displayed elements, wherein the set of selected elements comprises an intervening range of the displayed elements each having a center of mass determined to lie within an area of the display overlapped by, or substantially enclosed by, the first or second selection gesture, wherein the first or second selection gesture includes tracing through or around at least two elements, and wherein the determining includes at least one interpolation between a start point and an end point of the first or second selection gesture;

changing, by the at least one processor, in response to the determining, a display property of displayed elements from an original property to a modified property, in response to switching, by the at least one processor, between the first mode and the second mode, wherein the switching between the first mode and the second mode comprises a state transition for at least one GUI object between a hidden state and a displayed state;

restoring, by the at least one processor, in response to the determining, the display property of the displayed elements from the modified property to the original property, for only the selected elements, wherein unselected displayed elements retain the modified property;

generating, by the at least one processor, based on the set of selected elements in response to the determining, a database query configured to retrieve a designated subset of information from each respective data structure that corresponds to the selected elements from the database, wherein the designated subset of information from each respective data structure is designated based on at least one configuration setting corresponding to the first mode;

outputting, by the at least one processor, a data stream comprising a first list that comprises data entries corresponding to the set of selected elements, and a second list comprising selected pixel data corresponding to the set of selected elements; and generating a regression curve within a region of the GUI defined by the first or second selection gesture, wherein the regression curve is based at least in part on the first list, the second list, and a statistical calculation performed by the at least one processor in response to the database query and the first list.

2. The method of claim 1, further comprising:

transmitting, by the at least one processor, the database query to the database;

retrieving, by the at least one processor, from the database, the information corresponding to the selected elements;

analyzing, by the at least one processor, at least part of the information corresponding to the selected elements; and producing, by the at least one processor, output comprising a result of the analyzing of the at least part of the information corresponding to the selected elements.

3. The method of claim 2, the output further comprising:

a value corresponding to the result; and wherein the method further comprises at least one of:

displaying, by the at least one processor, the value corresponding to the result; and sending, by the at least one processor, the value corresponding to the result, to a program or function separate from the GUI.

4. The method of claim 1, wherein the input device comprises a tactile sensor apparatus; and wherein the first or second selection gesture comprises tactile input as a continuous motion along the input device.

5. The method of claim 1, wherein the input device comprises at least one of a light sensor, a position sensor, a motion sensor, or a motion controller; and wherein the first or second selection gesture comprises spatial input.

6. The method of claim 1, wherein the graphical representation comprises a bubble chart.

7. The method of claim 1, wherein the graphical representation comprises a bar chart.

8. The method of claim 1, wherein the at least one interpolation comprises a linear interpolation, a spline interpolation, or a combination thereof.

9. A system, comprising:

a memory; and at least one processor coupled to the memory and configured to perform operations comprising:

displaying a graphical representation of data on a display, wherein the graphical representation of the data comprises a plurality of elements, wherein the plurality of elements comprises displayed elements each having respective display position data corresponding to the display, wherein each element represents a respective data structure that corresponds to a respective entry in a database;

implementing a graphical user interface (GUI) configured to allow a selection of multiple elements of the plurality of elements, by a first selection gesture and a second selection gesture via an input device, wherein a first mode is configured to accept the first selection gesture, wherein a second mode is configured to accept the second selection gesture, wherein the second mode is distinct from the first mode, and wherein the first selection gesture and the second selection gesture comprise a same type of operation via at least one of the GUI and the input device;

mapping at least the first selection gesture to selection position data corresponding to the display, wherein the selection position data encompasses at least one invisible handle of a given element;

determining a set of selected elements of the plurality of elements of the graphical representation of the data, wherein the set of selected elements comprises an intersection of the selection position data with the display position data of the displayed elements, wherein the set of selected elements comprises an intervening range of the displayed elements each having a center of mass determined to lie within an area of the display overlapped by, or substantially enclosed by, the first or second selection gesture, wherein the first or second selection gesture includes tracing through or around at least two elements, and wherein the determining includes at least one interpolation between a start point and an end point of the first or second selection gesture;

changing in response to the determining, a display property of displayed elements from an original property to a modified property, in response to switching, by the at least one processor, between the first mode and the second mode, wherein the switching between the first mode and the second mode comprises a state transition for at least one GUI object between a hidden state and a displayed state;

restoring, in response to the determining, the display property of the displayed elements from the modified property to the original property, for only the selected elements, wherein unselected displayed elements retain the modified property;

generating, based on the set of selected elements in response to the determining, a database query configured to retrieve a designated subset of information from each respective data structure that corresponds to the selected elements from the database, wherein the designated subset of information from each respective data structure is designated based on at least one configuration setting corresponding to the first mode;

outputting a data stream comprising a first list that comprises data entries corresponding to the set of selected elements, and a second list comprising selected pixel data corresponding to the set of selected elements; and generating a regression curve within a region of the GUI defined by the first or second selection gesture, wherein the regression curve is based at least in part on the first list, the second list, and a statistical calculation performed by the at least one processor in response to the database query and the first list.

10. The system of claim 9, the at least one processor further configured to perform operations comprising:

transmitting the database query to the database;
retrieving, from the database, the information corresponding to the selected elements;
performing analysis of at least part of the information corresponding to the selected elements; and
producing output comprising a result of the analysis of the at least part of the information corresponding to the selected elements.

11. The system of claim 10, the output further comprising:
a value corresponding to the result; and
wherein the at least one processor is further configured to perform operations comprising at least one of:
displaying the value corresponding to the result; and
sending the value, corresponding to the result, to a program or function separate from the GUI.

12. The system of claim 9, wherein the input device comprises a tactile sensor apparatus; and wherein the first or second selection gesture comprises tactile input as a continuous motion along the input device.

13. The system of claim 9, wherein the input device comprises at least one of a light sensor, a position sensor, a motion sensor, or a motion controller; and
wherein the first or second selection gesture comprises spatial input.

14. The system of claim 9, wherein the graphical representation comprises a bubble chart.

15. The system of claim 9, wherein the graphical representation comprises a bar chart.

16. The system of claim 9, wherein the at least one interpolation comprises a linear interpolation, a spline interpolation, or a combination thereof.

17. A non-transitory computer-readable device having instructions stored thereon that, when executed by at least one computing device, cause the at least one computing device to perform operations comprising:
displaying a graphical representation of data on a display, wherein the graphical representation of the data comprises a plurality of elements, wherein the plurality of elements comprises displayed elements each having respective display position data corresponding to the display, wherein each element represents a respective data structure that corresponds to a respective entry in a database;
implementing a graphical user interface (GUI) configured to allow a selection of multiple elements of the plurality of elements, by a first selection gesture and a second selection gesture via an input device, wherein a first mode is configured to accept the first selection gesture, wherein a second mode is configured to accept the second selection gesture, wherein the second mode is distinct from the first mode, and wherein the first selection gesture and the second selection gesture comprise a same type of operation via at least one of the GUI and the input device;
mapping at least the first selection gesture to selection position data corresponding to the display, wherein the selection position data encompasses at least one invisible handle of a given element;
determining a set of selected elements of the plurality of elements of the graphical representation of the data, wherein the set of selected elements comprises an intersection of the selection position data with the display position data of the displayed elements, wherein the set of selected elements comprises an intervening range of the displayed elements each having a center of mass determined to lie within an area of the display overlapped by, or substantially enclosed by, the first or second selection gesture, wherein the first or second selection gesture includes tracing through or around at least two elements, and wherein the determining includes at least one interpolation between a start point and an end point of the first or second selection gesture;
changing in response to the determining, a display property of displayed elements from an original property to a modified property, in response to switching, by the at least one processor, between the first mode and the second mode, wherein the switching between the first mode and the second mode comprises a state transition for at least one GUI object between a hidden state and a displayed state;
restoring, in response to the determining, the display property of the displayed elements from the modified property to the original property, for only the selected elements, wherein unselected displayed elements retain the modified property;
generating, based on the set of selected elements in response to the determining, a database query configured to retrieve a designated subset of information from each respective data structure that corresponds to the selected elements from the database, wherein the designated subset of information from each respective data structure is designated based on at least one configuration setting corresponding to the first mode;
outputting a data stream comprising a first list that comprises data entries corresponding to the set of selected elements, and a second list comprising selected pixel data corresponding to the set of selected elements; and
generating a regression curve within a region of the GUI defined by the first or second selection gesture, wherein the regression curve is based at least in part on the first list, the second list, and a statistical calculation performed by the at least one processor in response to the database query and the first list.

18. The non-transitory computer-readable device of claim 17, the operations further comprising:
transmitting the database query to the database;
retrieving, from the database, the information corresponding to the selected elements;
analyzing at least part of the information corresponding to the selected elements; and
producing output comprising a result of the analyzing of the at least part of the information corresponding to the selected elements.

19. The non-transitory computer-readable device of claim 18, wherein the output further comprises:
a value corresponding to the result; and
the operations further comprising at least one of:
displaying the value corresponding to the result; and
sending the value corresponding to the result to a program or function separate from the GUI.

20. The non-transitory computer-readable device of claim 17, wherein the input device comprises a tactile sensor apparatus; and
wherein the first or second selection gesture comprises tactile input as a continuous motion along the input device.

21. The non-transitory computer-readable device of claim 17, wherein the input device comprises at least one of a light sensor, a position sensor, a motion sensor, or a motion controller; and
wherein the first or second selection gesture comprises spatial input.

22. The non-transitory computer-readable device of claim 17,
wherein the graphical representation comprises a bubble chart.

23. The non-transitory computer-readable device of claim 17,
wherein the graphical representation comprises a bar chart.

24. The non-transitory computer-readable device of claim 17, wherein the at least one interpolation comprises a linear interpolation, a spline interpolation, or a combination thereof.

* * * * *